(12) United States Patent
Bhanushali et al.

(10) Patent No.: US 12,183,047 B2
(45) Date of Patent: Dec. 31, 2024

(54) METHODS AND SYSTEMS FOR REMOVING OBJECTS FROM VIEW USING MACHINE LEARNING

(71) Applicant: Valeo Schalter und Sensoren GmbH, Bietigheim-Bissingen (DE)

(72) Inventors: Jagdish Bhanushali, Auburn Hills, MI (US); Peter Groth, Auburn Hills, MI (US)

(73) Assignee: VALEO SCHALTER UND SENSOREN GMBH, Bietigheim-Bissingen (DE)

( * ) Notice: Subject to any disclaimer, the term of this patent is extended or adjusted under 35 U.S.C. 154(b) by 144 days.

(21) Appl. No.: 18/048,649

(22) Filed: Oct. 21, 2022

(65) Prior Publication Data

US 2024/0135667 A1 Apr. 25, 2024
US 2024/0233304 A9 Jul. 11, 2024

(51) Int. Cl.
| | |
|---|---|
| *G06V 10/10* | (2022.01) |
| *G06T 5/77* | (2024.01) |
| *G06T 7/55* | (2017.01) |
| *G06V 10/26* | (2022.01) |
| *G06V 10/774* | (2022.01) |

(Continued)

(52) U.S. Cl.
CPC .............. *G06V 10/16* (2022.01); *G06T 5/77* (2024.01); *G06T 7/55* (2017.01); *G06V 10/273* (2022.01); *G06V 10/774* (2022.01); *G06V 10/82* (2022.01); *G06V 20/58* (2022.01); *B60R 1/22* (2022.01); *G06T 2207/20081* (2013.01); *G06T 2207/20084* (2013.01); *G06T 2207/30252* (2013.01); *G06V 2201/08* (2022.01)

(58) Field of Classification Search
CPC .... G06V 10/16; G06V 10/273; G06V 10/774; G06V 10/82; G06V 20/58; G06V 2201/08; G06T 5/77; G06T 7/55; G06T 2207/20081; G06T 2207/20084; G06T 2207/30252; B60R 1/22; B60R 2300/303; B60R 2300/60
USPC .......................................................... 348/36
See application file for complete search history.

(56) References Cited

U.S. PATENT DOCUMENTS

| | | | |
|---|---|---|---|
| 11,580,673 B1 * | 2/2023 | Ren ..................... | G06N 3/0464 |
| 11,636,570 B2 * | 4/2023 | Zheng ................ | G06V 30/2504 |
| | | | 345/428 |

(Continued)

*Primary Examiner* — Tung T Vo
(74) *Attorney, Agent, or Firm* — Osha Bergman Watanabe & Burton LLP

(57) ABSTRACT

A method for generating an unobstructed bowl view of a vehicle that includes obtaining a plurality of images from a plurality of cameras disposed on the vehicle and determining a plurality of depth fields. The method further includes detecting a plurality of distorted objects in the plurality of images with a first machine-learned model that assigns a class distribution to the detected distorted object and estimating a distance of each distorted object from its associated camera using the plurality of depth fields. The method further includes assigning an object weight to each distorted object in the plurality of distorted objects and removing at least one distorted objects from the plurality of images. The method further includes replacing each of the at least one removed distorted objects with a representative background generated by a second machine-learned model and stitching and projecting the plurality of images to form the unobstructed bowl view.

20 Claims, 14 Drawing Sheets

(51) Int. Cl.
    *G06V 10/82*     (2022.01)
    *G06V 20/58*     (2022.01)
    *B60R 1/22*     (2022.01)

(56) References Cited

U.S. PATENT DOCUMENTS

| | | | | |
|---|---|---|---|---|
| 11,694,089 | B1* | 7/2023 | Lowe | G06T 15/20 |
| | | | | 706/15 |
| 11,763,430 | B2* | 9/2023 | Mironica | G06T 5/77 |
| | | | | 345/618 |
| 11,823,061 | B2* | 11/2023 | Ma | G06N 3/006 |
| 11,854,203 | B1* | 12/2023 | Gafni | G06N 3/045 |
| 11,861,884 | B1* | 1/2024 | Pena Pena | G06V 30/19147 |
| 11,875,221 | B2* | 1/2024 | Lin | G06N 3/045 |
| 11,893,713 | B1* | 2/2024 | Zhang | G06T 9/00 |
| 2020/0242774 | A1* | 7/2020 | Park | G06T 7/11 |
| 2023/0127188 | A1* | 4/2023 | Sevecek | G06V 20/17 |
| | | | | 382/275 |
| 2023/0192124 | A1* | 6/2023 | Winter | G05D 1/0027 |
| | | | | 701/2 |
| 2023/0302999 | A1* | 9/2023 | Tsuda | H04N 5/268 |
| 2023/0319218 | A1* | 10/2023 | Ren | G06T 7/74 |
| | | | | 382/284 |
| 2023/0356728 | A1* | 11/2023 | Jain | G06F 3/013 |

\* cited by examiner

METHODS AND SYSTEMS FOR REMOVING OBJECTS FROM VIEW USING MACHINE LEARNING

BACKGROUND

Objects in images may occlude scenery. Further, in some instances, the objects in images may appear distorted. For example, cameras may be outfitted with fisheye lenses. A fisheye lens widens the field of view of a camera, however, objects within images acquired with such a camera are often unnaturally stretched or otherwise distorted. Distorted images may occlude scenery and may distract from the scenery. For example, distorted images captured by motor vehicle cameras and displayed in a console inside the vehicle may distract a driver from focusing on the road.

A plurality of images may be used to construct a perspective. For example, multiple images may be stitched together and projected onto a surface in 3-dimensional space to create a 3-dimensional perspective, or rendering, of the environment captured by the multiple images. When images with distorted objects are used to construct a 3-dimensional perspective, or are otherwise stitched together, apparent distortions pervade or are enhanced resulting in poor construction of the desired perspective. A perspective tainted with highly distorted objects may be considered unusable.

Further, when the purpose of constructing a perspective is to illustrate the surrounding environment or scenery captured by a plurality of images, objects within the plurality of images may be distracting and may obstruct useful, or desired, details of the environment. As such, distorted and undesired objects in images should be removed and replaced with a representative background in order to use the images to construct a useful and unobstructed perspective.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

One or more embodiments disclosed herein generally relate to a method for generating an unobstructed bowl view of a vehicle. The method includes obtaining a plurality of images from a plurality of cameras, wherein each of the plurality of cameras operates with a fisheye lens and is disposed on the vehicle and determining a plurality of depth fields, one for each image in the plurality of images. The method further includes detecting a plurality of distorted objects in the plurality of images with a first machine-learned model, wherein upon detection of a distorted object the first machine-learned model assigns a class distribution to the detected distorted object and estimating a distance of each distorted object from its associated camera using the plurality of depth fields. The method further includes assigning an object weight to each distorted object in the plurality of distorted objects, wherein the object weight is based on, at least, the class distribution and the estimated distance of the distorted object and removing at least one distorted objects from the plurality of images according to a criterion, wherein the criterion is based on the object weight assigned to the distorted object. The method further includes replacing each of the at least one removed distorted objects with a representative background, wherein there is one representative background for each of the at least one removed distorted objects and each representative background is generated by a second machine-learned model, stitching and projecting the plurality of images to form the unobstructed bowl view, and providing the unobstructed bowl view to one or more users of the vehicle, wherein the one or more users are local to the vehicle or remote to the vehicle.

One or more embodiments disclosed herein generally relate to a non-transitory computer readable medium storing instructions executable by a computer processor, the instructions including functionality for obtaining a plurality of images from a plurality of cameras, wherein each of the plurality of cameras operates with a fisheye lens and is disposed on a vehicle and determining a plurality of depth fields, one for each image in the plurality of images. The instructions further include functionality for detecting a plurality of distorted objects in the plurality of images with a first machine-learned model, wherein upon detection of a distorted object the first machine-learned model assigns a class distribution to the detected distorted object and estimating a distance of each distorted object in the plurality of distorted objects from its associated camera using the plurality of depth fields. The instructions further include functionality for assigning an object weight to each distorted object in the plurality of distorted objects, wherein the object weight is based on, at least, the class distribution and estimated distance of the distorted object and removing at least one distorted objects from the plurality of images according to a criterion, wherein the criterion is based on the object weight assigned to the distorted object. The instructions further include functionality for replacing each of the at least one removed distorted objects with a representative background, wherein there is one representative background for each of the at least one removed distorted objects and each representative background is generated by a second machine-learned model, stitching and projecting the plurality of images to form an unobstructed bowl view, and providing the unobstructed bowl view to one or more users of the vehicle, wherein the one or more users are local to the vehicle or remote to the vehicle.

One or more embodiments disclosed herein generally relate to a system that includes: a vehicle; a plurality of cameras, wherein each camera in the plurality of cameras is disposed on the vehicle, and wherein each camera in the plurality of cameras is outfitted with a fisheye lens; a depth estimator; a first machine-learned model; a second machine-learned model; an image masker; and a computer. The computer includes one or more processors, and a non-transitory computer readable medium storing instructions executable by the one or more computer processors, the instructions including functionality for obtaining a plurality of images from the plurality of cameras and determining, with the depth estimator, a plurality of depth fields, one for each image in the plurality of images. The instructions further include functionality for detecting a plurality of distorted objects in the plurality of images with the first machine-learned model, wherein upon detection of a distorted object the first machine-learned model assigns a class distribution to the detected distorted object and estimating a distance of each distorted object in the plurality of distorted objects from its associated camera using the plurality of depth fields. The instructions further include functionality for assigning an object weight to each distorted object in the plurality of distorted objects, wherein the object weight is based on, at least, the class distribution and estimated distance of the distorted object and removing, with the image masker, at least one distorted objects from the plurality of images according to a criterion, wherein the criterion is based on the object weight assigned to the distorted object. The instructions further include functionality for replacing each of the at least one removed distorted objects with a representative background, wherein there is one representative background for each of the at least one removed distorted objects and each representative background is generated by the second machine-learned model, stitching and projecting the plurality of images to form an unobstructed bowl view, and providing the unobstructed bowl view to one or more users of the vehicle, wherein the one or more users are local to the vehicle or remote to the vehicle.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
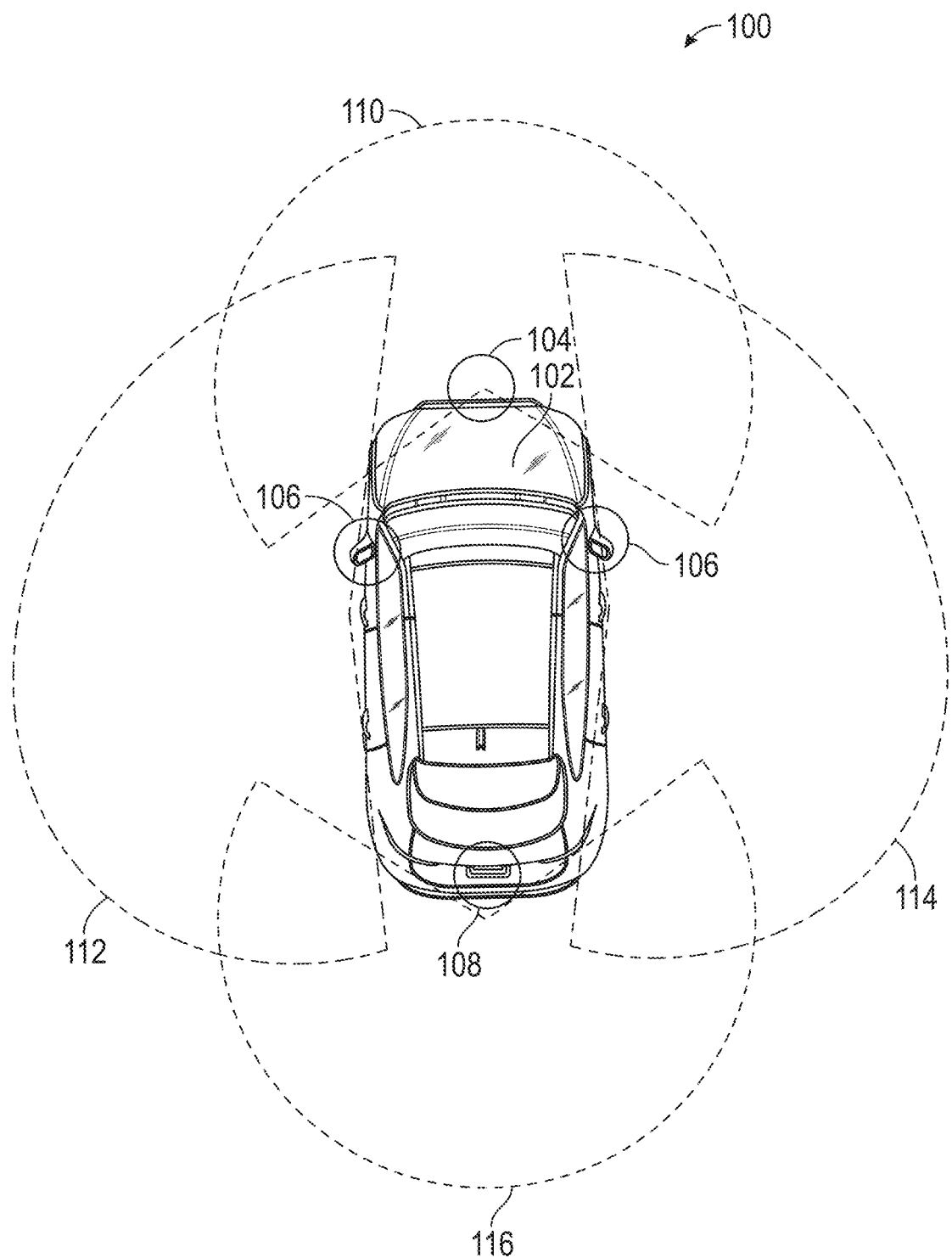
FIG. 1 depicts the field of view of a plurality of cameras disposed on a vehicle, in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. Thus, for example, reference to "acoustic signal" includes reference to one or more of such acoustic signals.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowchart may be omitted, repeated, and/or performed in a different order than the order shown. Accordingly, the scope disclosed herein should not be considered limited to the specific arrangement of steps shown in the flowchart.

Although multiple dependent claims are not introduced, it would be apparent to one of ordinary skill that the subject matter of the dependent claims of one or more embodiments may be combined with other dependent claims.

In the following description of FIGS. 1-13, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

Embodiments disclosed herein describe methods and systems to remove objects, where the objects may be distorted, from images obtained from cameras disposed on a vehicle. In accordance with one or more embodiments, the cameras on the vehicle are each outfitted with a fisheye lens. In other embodiments, the cameras disposed on the vehicle may consist of one or more pin-hole (i.e., conventional) cameras. The fisheye lens, while allowing for a wider field a view, distorts objects within its field of view. Further, in accordance with one or more embodiments, one or more obtained images may be stitched together to create a plurality of perspectives. One or more perspectives may appear 3-dimensional. Further, one or more perspectives may be interactive and provide functionality for, at least, viewpoint translation and rotation. For example, a perspective may be an interactive third-person perspective, where a user may view the surrounding of a vehicle from a viewpoint external to the vehicle. The process of image stitching may also result in distortion of objects in the image. In the case where a perspective contains one or more distorted objects, the distorted objects may be distracting or obstruct useful image information. Consequently, a perspective containing distorted objects is without utility. In accordance with one or more embodiments, distorted objects are detected and removed from images acquired with cameras outfitted with fisheye lenses. Further, distorted objects are replaced with semantically relevant representations. As such, generated perspectives are unobstructed and useful and depict scenery without obstacles and/or occlusions.

FIG. 1 depicts a surrounding camera view (100) of a vehicle (102). In accordance with one or more embodiments, a plurality of cameras may be disposed on a vehicle (102). In FIG. 1, the plurality of cameras is not explicitly illustrated. However, the location of each camera in the plurality of cameras disposed on the vehicle (102) is indicated in FIG. 1 with a circle. Each camera in the plurality of cameras may be relatively small compared to the vehicle (102). That is, due to its small size, a camera may be disposed on the vehicle (102) such that it is generally unnoticeable and does not hinder any functionality of the vehicle (102). Further, the plurality of cameras may be concealed (e.g., tucked under a piece of trim), and ruggedized (i.e., able to withstand vibrations, operational through a wide range of temperatures, waterproof, etc.). FIG. 1 depicts a front-facing camera (104), two side-facing cameras (106), and a rear-facing camera (108). The number of cameras disposed on a vehicle (102), and the location of the cameras, is not limited to that depicted in FIG. 1. In other embodiments, fewer or more cameras may be used. Each camera has a field of view (FOV). Field of view is used herein as a general term intended to indicate the extent of the observable world that is seen by a camera. Stated more technically, the field of view is a solid angle through which the detector of a camera is sensitive to electromagnetic radiation. The field of view of each of the plurality of cameras is depicted in FIG. 1 with a dashed closed curve. The front-facing camera (104) has a front-facing FOV (110) such that the front-facing camera (104) may acquire images of the environment in front of the vehicle (102). Likewise, the side-facing cameras (106) are associated with either the left-facing FOV (112) or right-facing FOV (114), where the terms "left" and "right" are relative to the top-down view of the vehicle (102) shown in FIG. 1. Finally, the rear-facing camera (108) has a rear-facing FOV (116) such that the rear-facing camera (108) may acquire images of the environment to the rear of the vehicle (102). As depicted in FIG. 1, the fields of view of the plurality of cameras are overlapping. As such, the entire surrounding environment of the vehicle (102) may be captured by the plurality of cameras. In other words, a set of images acquired by the plurality of cameras at a given instant in time can be said to capture the surroundings of the vehicle (102) at that time.

Figure 2:
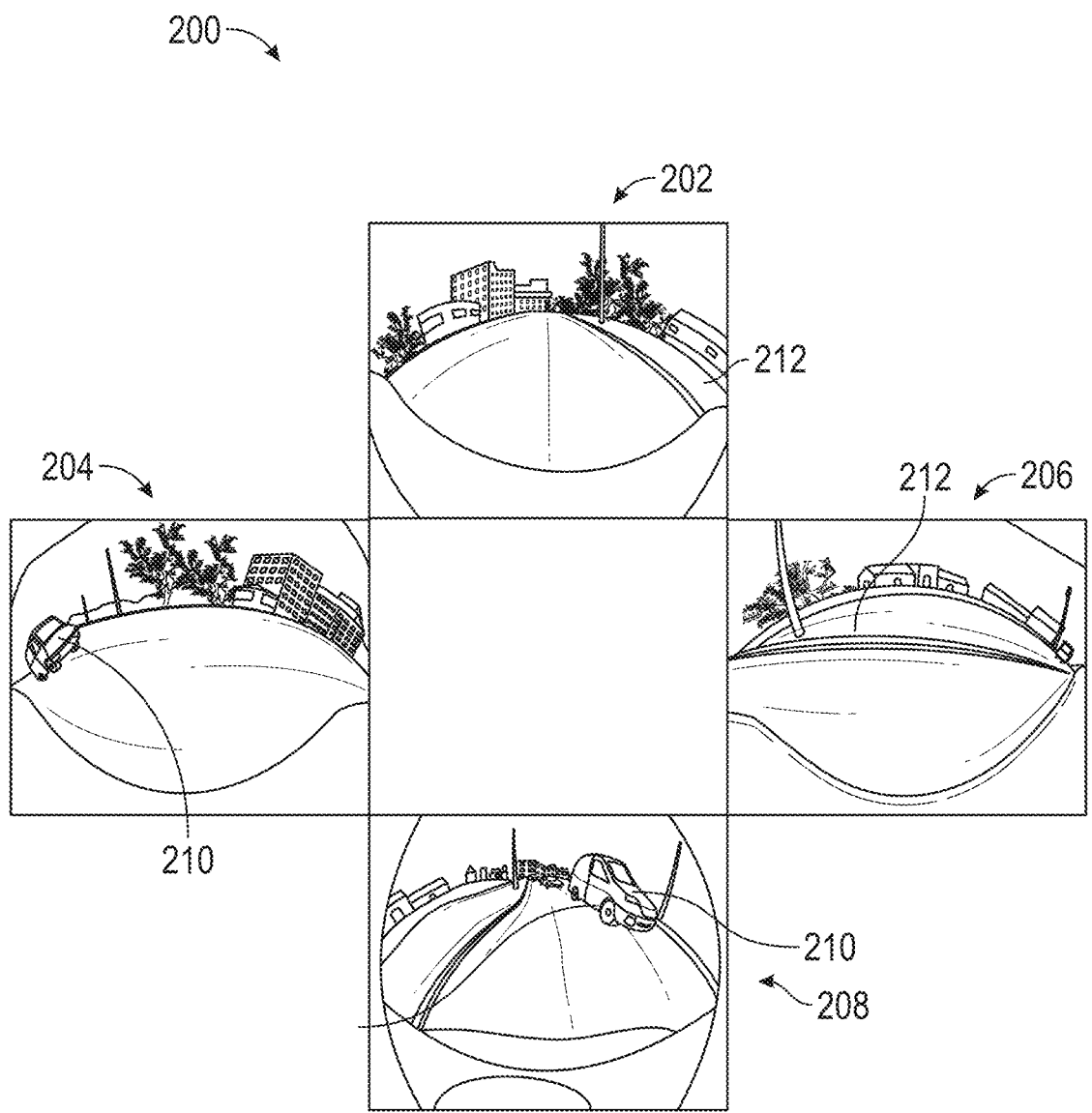
FIG. 2 depict an example plurality of images obtained with cameras, where each camera is outfitted with a fisheye lens, in accordance with one or more embodiments.

In accordance with one or more embodiments, each camera in the plurality of cameras disposed on the vehicle (102) is outfitted with a fisheye lens. In other embodiments, one or more cameras disposed on the vehicle (102) is a pin-hole, or conventional, camera. A fisheye lens promotes a wide, or enlarged, field of view. As such, when using cameras outfitted with fisheye lenses, fewer cameras are required to capture the same environmental extent. Using fewer cameras provides an economical advantage as each additional camera has an associated cost. However, images acquired using a camera with a fisheye lens are often distorted. For example, FIG. 2 depicts an example plurality of fisheye images (200), where each image is acquired using a camera disposed on a vehicle (102) and each camera is outfitted with a fisheye lens. In particular, the example plurality of fisheye images (200) is composed of four images: a front image (202) from a front-facing camera (104); a left image (204) from a side-facing camera (106) with a left-facing FOV (112); a right image (206) from a side-facing camera (106) with a right-facing FOV (114); and a rear image (208) from a rear-facing camera (108). The example plurality of fisheye images (200) forms a surrounding camera view (100). Further, the fields of view of the cameras used to acquire the example plurality of fisheye images (200) are overlapping. As seen, a proximate vehicle (210) appears in both the left image (204) and the right image (206). Additionally, portions of the images in the example plurality of fisheye images (200) are stretched or otherwise distorted. As an example, the street curb (212) highlighted in the front image (202) and the right image (206), which is known to be straight, is curved upward and is of non-uniform width throughout the images. Other instances of distorted objects may be identified in the example plurality of fisheye images (200).

As previously stated, one or more obtained images may be stitched together to create a plurality of perspectives. One or more perspectives may appear 3-dimensional. Further, one or more perspectives may be interactive and provide functionality for, at least, viewpoint translation and rotation. For example, using the plurality of cameras disposed on a vehicle (102) a bowl view perspective may be formed. A bowl view perspective, as will be described in greater detail in the following paragraphs, is constructed using a plurality of images which capture the surrounding environment of a vehicle (102). The surrounding environment is represented as a projection of the acquired images onto a fictional surface in 3-dimensional space.

Figure 3:
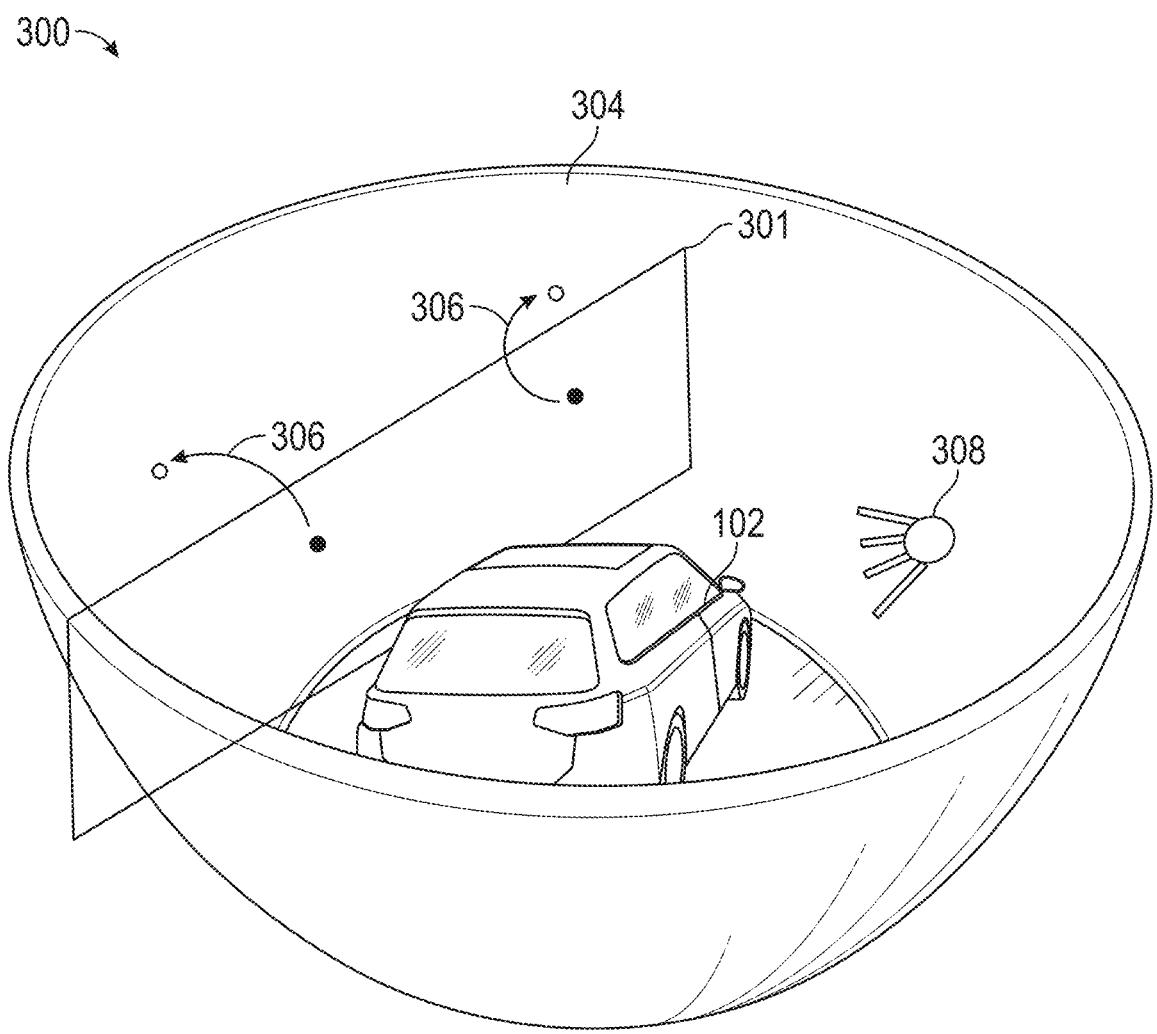
FIG. 3 depicts the construction of a bowl view, in accordance with one or more embodiments.

FIG. 3 depicts a bowl view construction (300), in accordance with one or more embodiments. A vehicle (102) that has a plurality of cameras configured to capture images of the surrounding environment is shown in FIG. 3. A representation of an image acquired by a camera on the vehicle (102) is shown as a frame (301). The placement of the frame (301) in FIG. 3 is intended to represent the extent of the environment captured by the image relative to the vehicle (102). For example, the frame (301) may be thought to represent a left image (204). The vehicle in FIG. 3 is depicted as residing in a fictional bowl (304). It is emphasized that the bowl (304) is not a physical structure. The bowl (304) represents a non-planar, imaginary 2-dimensional surface. The 2-dimensional surface, or the bowl (304), may take shapes other than that depicted in FIG. 3.

A bowl view perspective is constructed by projecting the images acquired by the plurality of cameras disposed on the vehicle (102) onto the bowl (304). In the projection, points are mapped from the acquired images onto the non-planar 2-dimensional surface (i.e., the bowl (304)). Projecting the images to the bowl (304) may result in distortions, or further distortions, in the images. FIG. 3 depicts the mapping of some example points (306) from the frame (301), which represents an example image, to the bowl (304). Projection methods may include simple procedures such as ray tracing, mathematically based transformations, or computational algorithms. A projection method may borrow from the subfield of mathematics known as complex analysis to create a projection which respects a set of desired properties. For example, the well-known Mercator projection, which maps the geographic features of the substantially spherical Earth to a 2-dimensional world map, preserves conformality (i.e., parallel lines remain parallel through the projection). One with ordinary skill in the art will recognize that there are many ways to project the acquired images onto the bowl (304). As such, the fact that not all possible projection methods are enumerated herein does not impose a limitation on the present disclosure. Once the images are projected onto the bowl (304), and stitched or otherwise merged as required, the resulting bowl view perspective fully captures the surrounding environment and may be perceived as 3-dimensional. Further, the bowl view perspective allows for interactivity. For example, a viewpoint (308) may be chosen from any location within the bowl. The viewpoint (308) may be translated or rotated within the bowl and the representation of the vehicle (102) and surrounding environment may be displayed to a user from the perspective of the viewpoint (308). Further, the viewpoint (308) may be positioned within the vehicle (102). Images from the plurality of cameras may be acquired continuously as the vehicle (102) travels. A bowl view perspective may be constructed from the images in real time. As such, the bowl view may be used to display the surrounding environment of the vehicle (102) even as the environment changes.

Figure 4:
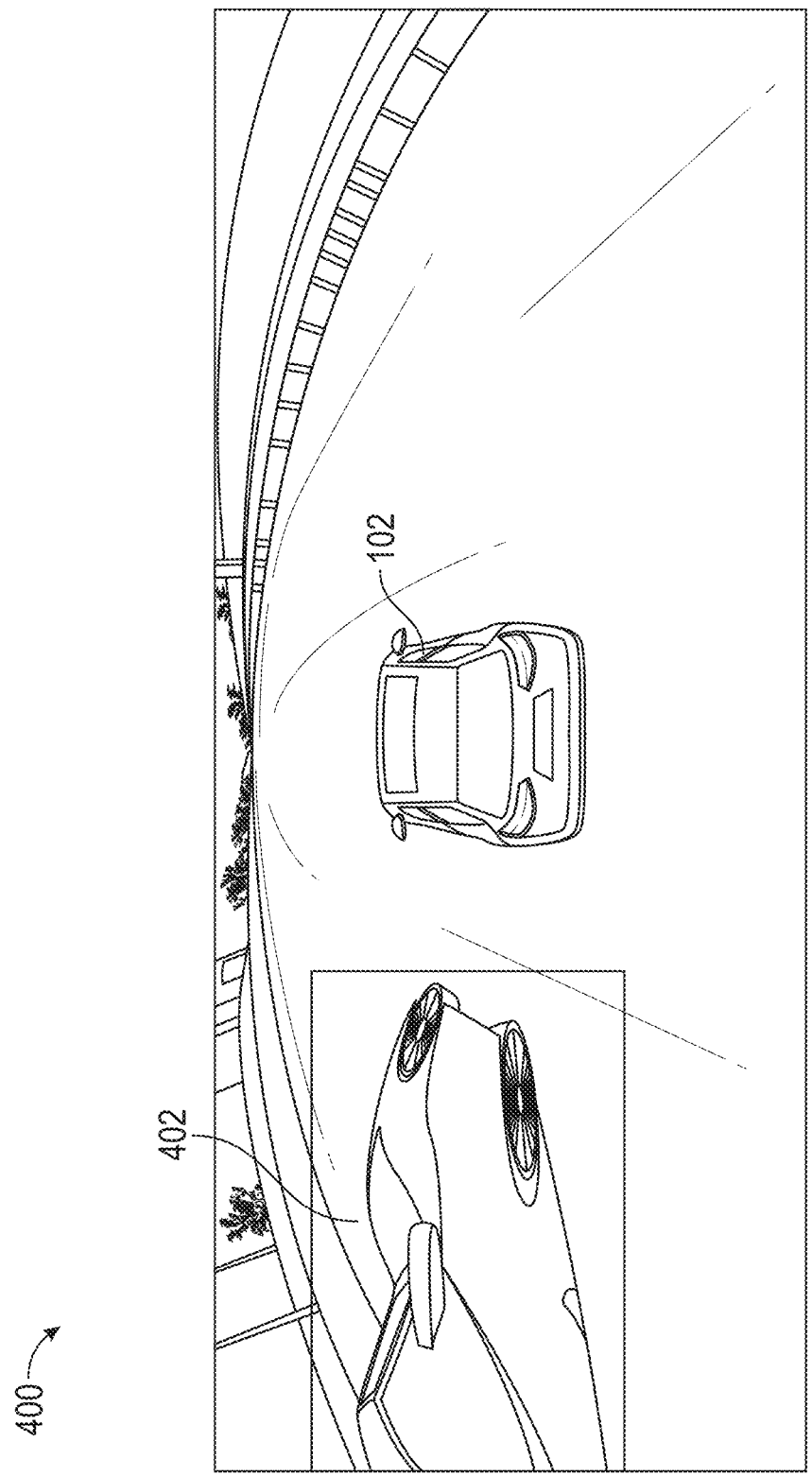
FIG. 4 depicts an example bowl view perspective, in accordance with one or more embodiments.

FIG. 4 depicts an example bowl view perspective (400). In the example of FIG. 4, the viewpoint (308) is positioned external and to the rear of the vehicle (102) but facing forward toward the vehicle (102). As seen, the bowl view perspective (400) provides a rendering of the surroundings of the vehicle (102). As previously stated, the bowl view perspective (400) may be updated in real time. Objects in the bowl view perspective (400), such as the adjacent vehicle (402) shown in FIG. 4, may appear distorted. The distortion of objects in the bowl view perspective (400) is the result of using fisheye lenes with the cameras disposed on the vehicle (102) and the process of projecting the images acquired with the cameras onto the bowl (304). Distorted objects are, at the very least, distracting. Further, an end use of the bowl view perspective (400) is to provide a display of the landscape surrounding the vehicle (102) to a user. Herein, landscape refers to natural objects, such as trees and animals, and city infrastructure such as buildings and roads. As such, vehicles and pedestrians obstruct the landscape. The obstruction of these objects is amplified when the objects are distorted. Consequently, a useful bowl view perspective (400) would be one with all distorted and undesired objects removed. It is noted that the distortion of objects seen in the bowl view perspective (400) is generally amplified in the near field. That is, objects closer to the vehicle (102) will generally be displayed with greater distortion.

In accordance with one or more embodiments, a series of machine-learned models are applied to images acquired using cameras disposed on a vehicle (102) and outfitted with fisheye lenses to detect, identify, remove, and replace distorted and undesired objects. The result of these processes is a clean image without distorted and undesired (i.e., obstructive) objects that, when used to construct a bowl view perspective (400), produces a bowl view perspective (400) that displays an unobstructed landscape and is useful.

Machine learning, broadly defined, is the extraction of patterns and insights from data. The phrases "artificial intelligence", "machine learning", "deep learning", and "pattern recognition" are often convoluted, interchanged, and used synonymously throughout the literature. This ambiguity arises because the field of "extracting patterns and insights from data" was developed simultaneously and disjointedly among a number of classical arts like mathematics, statistics, and computer science. For consistency, the term machine learning, or machine-learned, will be adopted herein, however, one skilled in the art will recognize that the concepts and methods detailed hereafter are not limited by this choice of nomenclature.

One with ordinary skill in the art will recognize that the field and concepts encompassed by machine learning are both too broad and too deep to be given an adequate description herein. However, to provide requisite context for some of the machine-learned methods employed by one or more embodiments of the present invention, a minimal description of neural networks and convolutional neural networks is given in the following paragraphs. It is emphasized that the following descriptions are intended to provide a cursory understanding of some machine-learned methods and should not be considered limiting on the present disclosure.

Figure 5:
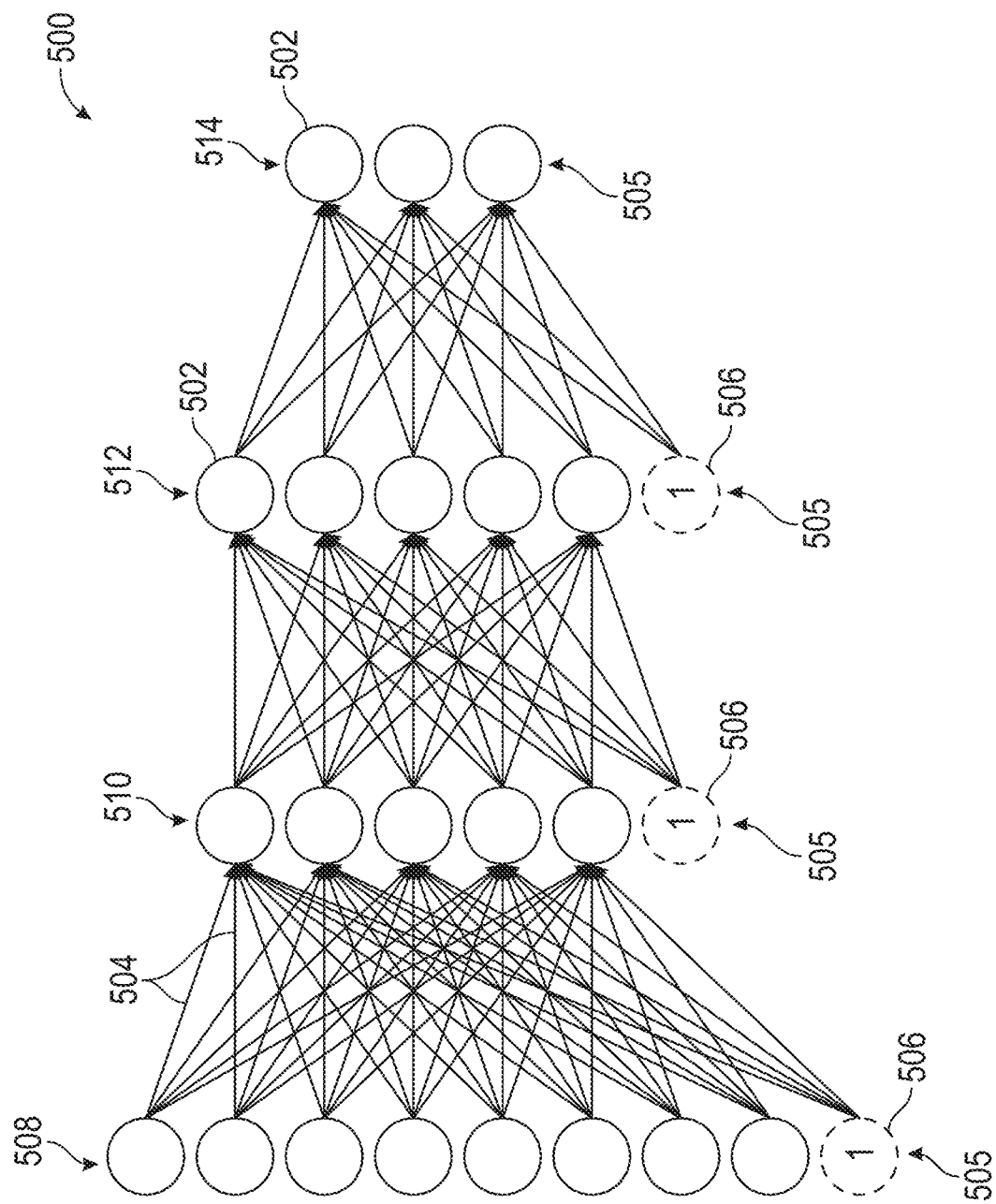
FIG. 5 depicts a neural network in accordance with one or more embodiments.

One type of machine-learned model is a neural network. A neural network may often be used as a subcomponent of a larger machine-learned model. A diagram of a neural network is shown in FIG. 5. At a high level, a neural network (500) may be graphically depicted as being composed of nodes (502), where in FIG. 5 any circle represents a node, and edges (504), shown in FIG. 5 as directed lines. The nodes (502) may be grouped to form layers (505). FIG. 5 displays four layers (508, 510, 512, 514) of nodes (502) where the nodes (502) are grouped into columns, however, the grouping need not be as shown in FIG. 5. The edges (504) connect the nodes (502). Edges (504) may connect, or not connect, to any node(s) (502) regardless of which layer (505) the node(s) (502) is in. That is, the nodes (502) may be sparsely and residually connected. However, when every node (502) in a layer is connected to every node in an adjacent layer (502), the layer is said to be densely connected. If all layers in a neural network (500) are densely connected, the neural network (500) may be said to be a dense, or densely connected, neural network (500). A neural network (500) will have at least two layers (505), where the first layer (508) is considered the "input layer" and the last layer (514) is the "output layer". Any intermediate layer (510, 512) is usually described as a "hidden layer". A neural network (500) may have zero or more hidden layers (510, 512) and a neural network (500) with at least one hidden layer (510, 512) may be described a "deep" neural network or a "deep learning method". As such, in some embodiments, the machine-learned model is a deep neural network. In general, a neural network (500) may have more than one node (502) in the output layer (514). In this case the neural network (500) may be referred to as a "multi-target" or "multi-output" network.

Nodes (502) and edges (504) carry additional associations. Namely, every edge is associated with a numerical value. The edge numerical values, or even the edges (504) themselves, are often referred to as "weights" or "parameters". While training a neural network (500), numerical values are assigned to each edge (504). Additionally, every node (502) is associated with a numerical variable and an activation function. Activation functions are not limited to any functional class, but traditionally follow the form $$A = f\left(\sum_{i \in (incoming)} [(\text{node value})_i (\text{edge value})_i]\right) \quad (1)$$

where i is an index that spans the set of "incoming" nodes (502) and edges (504) and $f$ is a user-defined function.

Incoming nodes (502) are those that, when viewed as a graph (as in FIG. 5), have directed arrows that point to the node (502) where the numerical value is being computed. Some functions for $f$ may include the linear function $f(x)=x$, sigmoid function $$f(x) = \frac{1}{1+e^{-x}},$$

and rectified linear unit function $f(x)=\max(0, x)$, however, many additional functions are commonly employed. Every node (502) in a neural network (500) may have a different associated activation function. Often, as a shorthand, activation functions are described by the function $f$ by which it is composed. That is, an activation function composed of a linear function $f$ may simply be referred to as a linear activation function without undue ambiguity.

When the neural network (500) receives an input, the input is propagated through the network according to the activation functions and incoming node (502) values and edge (504) values to compute a value for each node (502). That is, the numerical value for each node (502) may change for each received input. Occasionally, nodes (502) are assigned fixed numerical values, such as the value of 1, that are not affected by the input or altered according to edge (504) values and activation functions. Fixed nodes (502) are often referred to as "biases" or "bias nodes" (506), displayed in FIG. 5 with a dashed circle.

In some implementations, the neural network (500) may contain specialized layers (505), such as a normalization layer (batch or layer-wise normalization may occur) or a dropout layer, or additional connection procedures, like concatenation. One skilled in the art will appreciate that these alterations do not exceed the scope of this disclosure.

As noted, the training procedure for the neural network (500) comprises assigning values to the edges (504). To begin training the edges (504) are assigned initial values. These values may be assigned randomly, assigned according to a prescribed distribution, assigned manually, or by some other assignment mechanism. Once edge (504) values have been initialized, the neural network (500) may act as a function, such that it may receive inputs and produce an output. As such, at least one input is propagated through the neural network (500) to produce an output. A given data set may be said to be composed of inputs and associated target(s), where the target(s) represent the "ground truth", or the otherwise desired output. Such a data set is provided to the neural network (500) for training. The inputs are processed by the neural network (500) and the output of the neural network (500) is compared to the associated target(s) of the input data. The comparison of the neural network (500) output to the target(s) is typically performed by a so-called "loss function"; although other names for this comparison function such as "error function", "objective function", "value function", and "cost function" are commonly employed. Many types of loss functions are available, such as the mean squared error function, however, the general characteristic of a loss function is that the loss function provides a numerical evaluation of the similarity between the neural network (500) output and the associated target(s). The loss function may also be constructed to impose additional constraints on the values assumed by the edges (504), for example, by adding a penalty term, which may be physics-based, or a regularization term. Generally, the goal of a training procedure is to alter the edge (504) values to promote similarity between the neural network (500) output and associated target(s) over the data set. Thus, the loss function is used to guide changes made to the edge (504) values, typically through a process called "backpropagation".

While a full review of the backpropagation process exceeds the scope of this disclosure, a brief summary is provided. Backpropagation consists of computing the gradient of the loss function over the edge (504) values. The gradient indicates the direction of change in the edge (504) values that results in the greatest change to the loss function. Because the gradient is local to the current edge (504) values, the edge (504) values are typically updated by a "step" in the direction indicated by the gradient. The step size is often referred to as the "learning rate" and need not remain fixed during the training process. Additionally, the step size and direction may be informed by previously seen edge (504) values or previously computed gradients. Such methods for determining the step direction are usually referred to as "momentum" based methods.

Once the edge (504) values have been updated, or altered from their initial values, through a backpropagation step, the neural network (500) will likely produce different outputs. Thus, the procedure of propagating at least one input through the neural network (500), comparing the neural network (500) output with the associated target(s) with a loss function, computing the gradient of the loss function with respect to the edge (504) values, and updating the edge (504) values with a step guided by the gradient, is repeated until a termination criterion is reached. Common termination criteria are: reaching a fixed number of edge (504) updates, otherwise known as an iteration counter; a diminishing learning rate; noting no appreciable change in the loss function between iterations; reaching a specified performance metric as evaluated on the data or a separate hold-out data set. Once the termination criterion is satisfied, and the edge (504) values are no longer intended to be altered, the neural network (500) is said to be "trained". It is noted that depending on the construction of the loss function, in some cases similarity between the target(s) and the neural network (500) output may be promoted by minimizing the loss function. In other cases, the objective may be to maximize the loss function (if maximization is the goal, the loss function is usually referred to as an objective or value function). One with ordinary skill in the art will appreciate that tasks of maximization and minimization can be made equivalent through techniques such as negation. In other words, when updating the edge (504) values with a step guided by the gradient, depending on the construction of the loss function, the step may be in the direction of the gradient or in a direction opposite to the gradient.

A machine-learned model architecture defines the entire structure of a machine-learned model. For example, in the case of a neural network (500), the number of hidden layers in the network, the type of activation function(s) used, and the number of outputs must be specified. Additionally, the use of, and location of, specialized layers such as batch normalization must be defined. Each of these choices, for example, the choice of how many hidden layers are in a neural network (500), is said to be a hyperparameter of the machine-learned model. In other words, a machine-learned model architecture specifies the hyperparameters surrounding the machine-learned model. Note that a machine-learned model architecture does not describe the values of the edges (weights, parameters) of the machine-learned model. These must be learned during training or are otherwise specified when using a pre-trained model.

Another type of machine-learned model is a convolutional neural network (CNN). A CNN is similar to a neural network (500) in that it can technically be graphically represented by a series of edges (504) and nodes (502) grouped to form layers. However, it is more informative to view a CNN as structural groupings of weights; where here the term structural indicates that the weights within a group have a relationship. CNNs are widely applied when the data inputs also have a structural relationship, for example, a spatial relationship where one input is always considered "to the left" of another input. For example, an image has a structural relationship as each pixel has a directional relationship with respect to its adjacent pixels. A structural grouping, or group, of weights is herein referred to as a "filter". The number of weights in a filter is typically much less than the number of inputs. In a CNN, the filters can be thought as "sliding" over, or convolving with, the inputs to form an intermediate output or intermediate representation of the inputs which still possesses a structural relationship. Like unto the neural network (500), the intermediate outputs are often further processed with an activation function. Many filters may be applied to the inputs to form many intermediate representations. Additional filters may be formed to operate on the intermediate representations creating more intermediate representations. This process may be repeated as prescribed by a user. The filters, when convolving with an input, may move in strides such that some components of the input (e.g., pixels) are skipped. Groupings of the intermediate output representations may be pooled, for example, by considering only the maximum value of a group in subsequent calculations. Strides and pooling may be used to downsample the intermediate representations. Like unto the neural network (500), additional operations such as normalization, concatenation, dropout, and residual connections may be applied to the intermediate representations. Further, intermediate representations may be upsampled, for example, through techniques such as transpose convolution. In a CNN there is a "final" group of intermediate representations, wherein no more filters act on these intermediate representations. Generally, the structural relationship of the final intermediate representations is ablated; a process known as "flattening". The flattened representation is usually passed to a neural network (500), or a least a densely connected layer, to produce the final output. Note, that in this context, the neural network (500) is still considered part of the CNN. Like unto a neural network (500), a CNN is trained, after initialization of the filter weights, and the edge (504) values of the internal neural network (500), if present, with the backpropagation process in accordance with a loss function.

In one or more embodiments, a first machine-learned model is trained and used to detect and classify distorted objects and undesired objects in images acquired from cameras disposed on the vehicle (102). Because CNNs are adept at processing images, in one or more embodiments, the first machine-learned model contains a CNN. In other embodiments, the first machine-learned model uses a visual transformer (ViT), which is another type of machine-learned model known to work well when processing images. Detection indicates the location of an object in an image. The location of an object may be indicated using a bounding box that circumscribes the portion of the image containing the object or the location of an object may be indicated pixel-wise, where each pixel which is found to be associated with an object is flagged or given an identifier (i.e., instance segmentation). Detected objects are also classified by the first machine-learned model. For each detected object, a class probability distribution is returned. The class probability distribution indicates the probability that an object belongs to each class in a given set of classes. For example, a set of classes may include the classes {'car', 'truck', 'pedestrian', 'cyclist', 'traffic signal', 'building', etc.}.

Many machine-learned model architectures are described in the literature for the task of object detection and identification. These machine-learned models are usually based on one or more convolutional neural networks. For example, regional based CNNs (R-CNNs) and single shot detectors (SSDs) (and their variants) are commonly employed architectures. Any of these architectures, or others not explicitly referenced herein, may be used in the first machine-learned model without departing from the scope of this disclosure. However, even if one or more of these architectures is used in the first machine-learned model, the weights of the first machine-learned model must be determined through model training. It is unlikely that a pre-trained model, or a model where the weights are already provided, would accurately detect objects in the supplied images. This is because the images processed by the first machine-learned model are often distorted whereas any pre-trained model found in the literature is likely trained using images with non-distorted objects. As stated above, the first machine-learned model must be trained and used to detect distorted objects. In accordance with one or more embodiments, a first training dataset is used to train the first machine-learned model. The first training dataset contains training images obtained from one or more cameras, each outfitted with a fisheye lens, disposed on a vehicle (102). The first training dataset contains both the original training images to be used as inputs to the machine-learned model and an annotated version of each training image which indicates the desired target(s). In some embodiments, the annotation is performed manually by a human. Once the first training dataset is curated, the first training dataset may be used to train the first machine-learned model to detect and identify (through a class distribution) one or more distorted objects in one or more supplied images.

Figure 6:
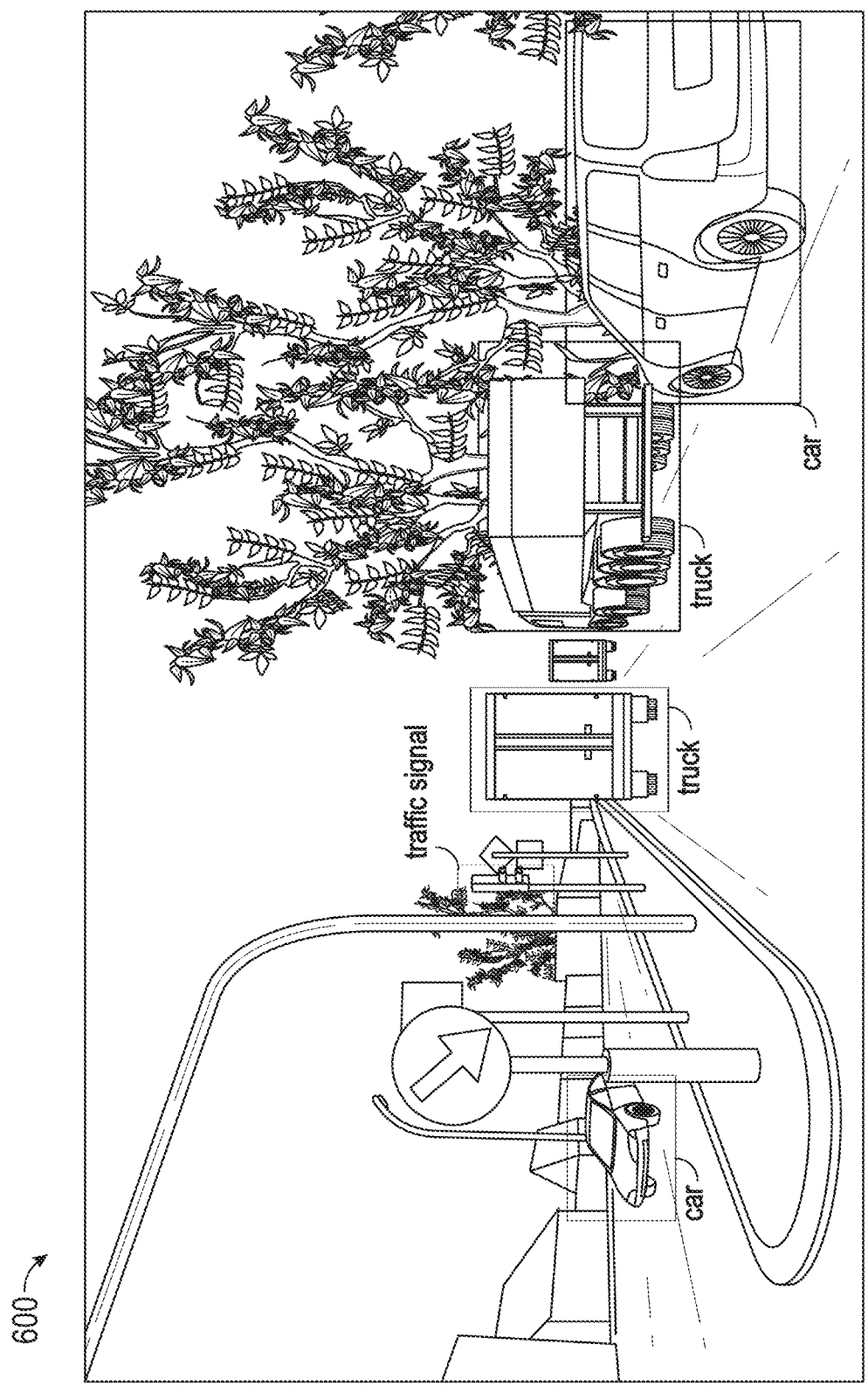
FIG. 6 depicts an object detection result in accordance with one or more embodiments.

FIG. 6 depicts an object detection result (600) of the first machine-learned model in accordance with one or more embodiments. In the example of FIG. 6, the locations of various objects in the image are indicated with a bounding box returned by the first machine-learned model. In other embodiments, the location of identified objects in an image may be identified on a per pixel basis. Additionally, for each detected object, a class distribution is returned. In FIG. 6, the class with the highest probability for each object is displayed on the object detection result (600) near the associated object. As seen in FIG. 6, various vehicles are correctly detected and identified as well as a traffic signal.

Figure 7A:
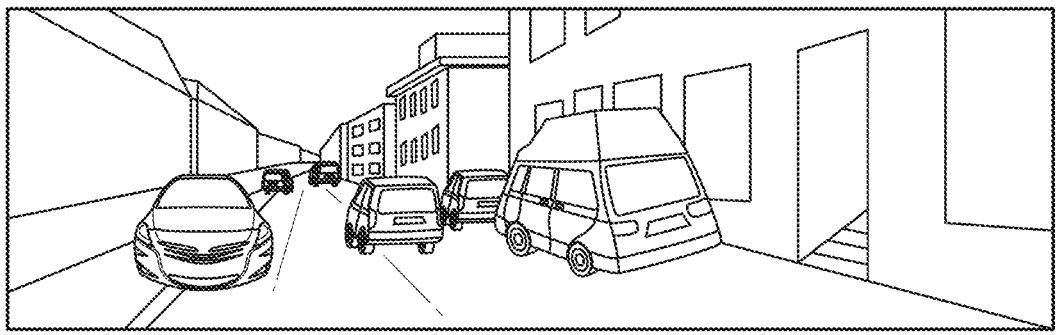
FIG. 7A depicts an example streetview image in accordance with one or more embodiments.
Figure 7B:
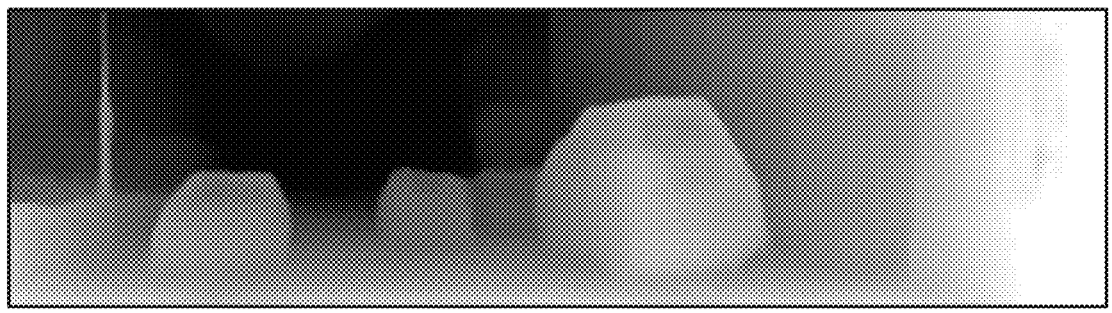
FIG. 7B depicts an example depth field in accordance with one or more embodiments.

In accordance with one or more embodiments, each image received from the cameras disposed on the vehicle (102) is processed by a depth estimator. In one or more embodiments, the depth estimator returns a depth field for the image. In one or more embodiments, the depth estimator consists of a physical depth sensor fixedly attached to the vehicle. The depth field indicates the distance, or depth, of every pixel in the image from the acquiring camera. For example, FIG. 7A depicts an example streetview image (701) received by a camera disposed on a vehicle (102). The example streetview image (701) is processed by the depth estimator. The depth estimator returns the depth field. The depth field (702) of the example streetview image (701) of FIG. 7A is shown in FIG. 7B. In FIG. 7B, pixels (and thereby objects) which are further from the camera are darker, while those closer to the camera are lighter. In other embodiments, the depth estimator returns an estimated distance for regions of an image, for example, regions where a distorted or otherwise undesired object has been detected.

In accordance with one or more embodiments, an object weight is assigned to each detected object in an image. The object weight is determined using the class distribution of the object and the estimated depth/distance of the object as determined by the depth estimator. For example, when the depth estimator returns a depth field of the image which contains the object, the object weight assigned to the object in the image is calculated using a user-defined function which accepts the class distribution of the object, as determined by the first machine-learned model, and the depth field of the image, as determined by the depth estimator, as inputs. In one embodiment, the weight function is given as $$ow = \text{weight function(class distribution, depth field)} = \begin{cases} 1/avg(depth_r), & \text{argmax(class distribution)} \in \{\text{car, truck, pedestrian}\} \\ 0, & \text{otherwise} \end{cases} \quad (2)$$

where ow is the returned object weight associated with the object, argmax(class distribution) returns the class name of the class with the highest probability, and $avg(depth_r)$ returns the average pixelwise depth of the region r in the depth field that contains the object. In other words, EQ. 2 returns a higher valued object weight for objects nearer to the camera so long as the object is determined to be either a car, truck, or pedestrian. Embodiments are not limited to using the weight function given by EQ. 2. Weight functions may be tailored according to user-specific needs.

Once distorted and undesired objects have been detected in an image received from a camera disposed on the vehicle (102), and an object weight has been assigned to each distorted object, distorted objects are removed from the image by an image masker. The image masker follows a threshold criterion, based on the assigned object weight of an object, to determine which objects should be removed (i.e., masked) in the image and which should be retained unaltered. For example, the threshold criterion may specify that for an image with a detected distorted object with an assigned object weight greater than a value v, the pixels in the region of the distorted object in the image should be masked to values of zero.

Figure 8A:
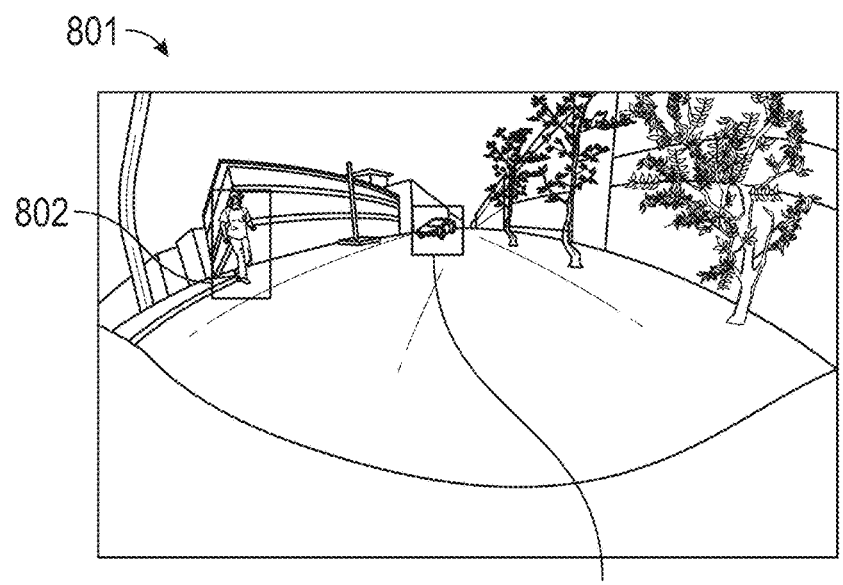
FIG. 8A shows an example image in accordance with one or more embodiments.
Figure 8B:
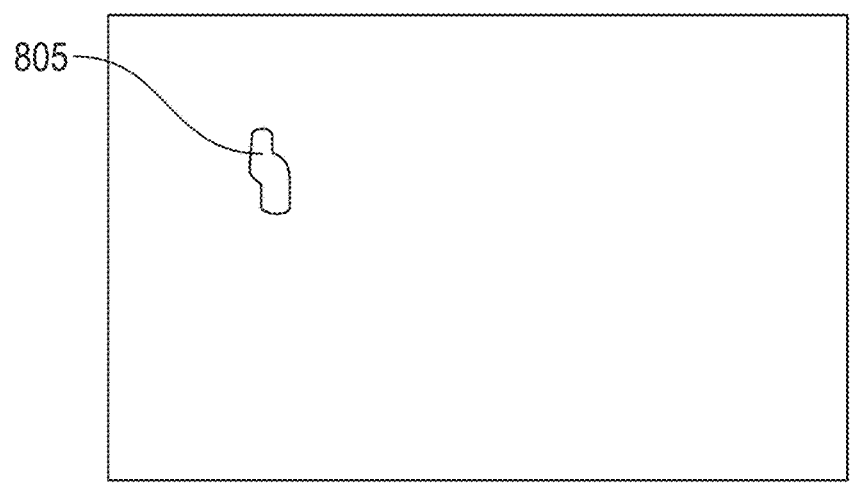
FIG. 8B shows an example image mask in accordance with one or more embodiments.

FIG. 8A depicts an example image (801). In the example image (801), two objects have been detected by the first machine-learned model; namely, a pedestrian (802) and a distant vehicle (803). The distance/depth of these objects is determined using a depth estimator, as previously described. An object weight is assigned to these two objects according to their class (pedestrian, vehicle) and distance/depth. For example, in accordance with one or more embodiments, EQ. 2 is used to determine the object weight for the pedestrian (802) and the distant vehicle (803) of FIG. 8A. In the present example, the distant vehicle (803) does not meet the threshold criterion of the image masker and should thus be retained. FIG. 8B depicts an example mask (804) corresponding to the example image (801) of FIG. 8A. In the example mask (804), the pixels corresponding to the detected pedestrian (802) of FIG. 8A are flagged (masked portion (805)).

In accordance with one or more embodiments, a second machine-learned model is trained and used to inpaint masked portions of images. Inpainting consists of filling in the masked region of an image with a generated image or pixel values which accurately represent the background of the masked portion. For example, in the case where a distorted car is detected in an image by the first machine-learned model and removed by the image masker, the second machine-learned model generates a region (or image) which represents the environment behind the distorted car. The generated region is used to replace the masked region of the affected image such that the distorted and obstructive object is removed and only the landscape remains visible in the affected image.

Figure 9:
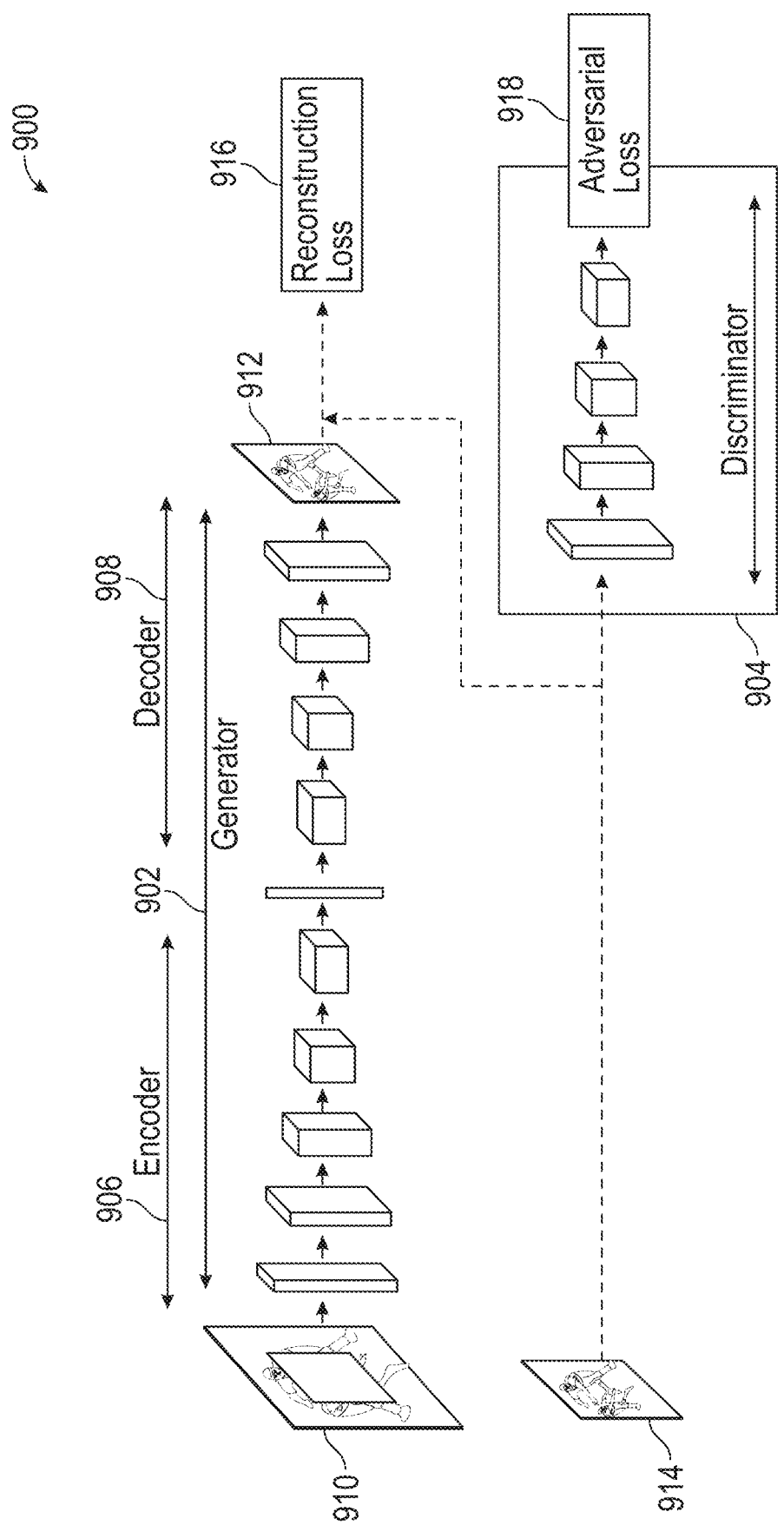
FIG. 9 depicts a generative adversarial network in accordance with one or more embodiments.

The second machine-learned model may be an autoencoder or a generative adversarial network (GAN). In either case, the second machine-learned model may make use of CNNs. For example, a GAN which uses deep convolutional neural networks may be referred to as a DCGAN. The benefit of using a DCGAN or autoencoder is that each is capable of generating regions for infilling that are semantically informed. FIG. 9 depicts the general architecture of DCGAN (900). During training, the DCGAN (900) is composed of a generator (902) and a discriminator (904). The generator (902) and the discriminator (904) are each composed of blocks, represented in FIG. 9 as graphical blocks. The blocks may contain neural network layers that perform one or more convolutions and other processes such as normalization and dropout. The generator (902) can further be partitioned into an encoder (906) and a decoder (908). The generator accepts a masked image (910) and outputs an inpainting image (912) that can be used to fill in the masked region of the masked image (910). Generally, the encoder (906) is composed of convolutional blocks which downsample, or otherwise compress, the masked image (910). The decoder (908) decompresses the encoded input to form the inpainting image (912). The discriminator (904), which in one or more embodiments is also composed of convolutional blocks, accepts a proposed image (914) and outputs a continuous prediction indicating the discriminator's (904) belief that the proposed image (914) is generated (i.e., fake) or an original image (i.e., real). In one or more embodiments, the discriminator (904) may be composed of one or more sub-discriminators acting at different spatial scales. For example, the discriminator (904) may be composed of a local discriminator and a global discriminator. Generally, the local discriminator quantifies the realism of a generated inpainting image (912) and the global discriminator quantifies the probability that a generated inpainting image (912) portion belongs in the context of the masked image (910). In practice, one with ordinary skill in the art will appreciate that many adaptions and alterations can be made to the general DCGAN (900) architecture of FIG. 9 without departing from the scope of this disclosure.

Figure 8C:
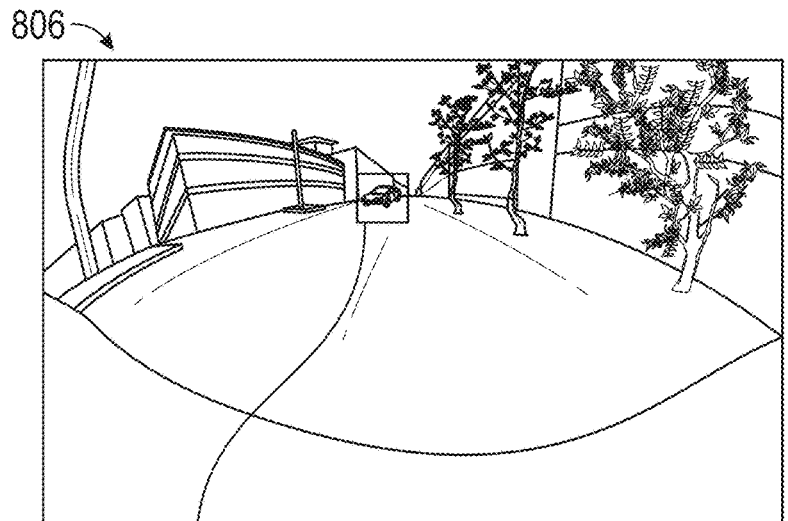
FIG. 8C shows an example inpainted image, in accordance with one or more embodiments.

As with the machine-learned models previously described, the DCGAN (900) is parameterized by a set of weights (or edge values). Training the DCGAN consists of determining the weights that minimize a given loss function. For the DCGAN (900) the loss function is typically split into two parts, namely, a reconstruction loss (916) and an adversarial loss (918). During training, the generator receives input-target pairs of images. The input is an image with a masked portion. The target is the masked portion of the input image but without the mask applied. The reconstruction loss quantifies the difference between the original unmasked image and the generated image. To minimize the reconstruction loss, the generator (902) is encouraged to produce inpainting images (912) that are similar to the original image prior to masking. In accordance with one or more embodiments, when computing the reconstruction loss during training, the generator is given a second training dataset composed of one or more masked images (910) and associated target images with the correct background (only landscape) of the masked images (910). That is, the second training dataset may be artificially generated by masking regions in one or more images where a distorted object is not present. During training, the discriminator (904) is given a third training dataset composed of original images (without masks) and images that have been masked, processed by the generator (902), and have had the masked region infilled by the output of the generator (902). That is, the discriminator (904) receives both "real" images and "fake" images where one or more regions of the fake images have been generated by the generator (902). The adversarial loss (918) quantifies the accuracy of the discriminator (904) when determining if an image received by the discriminator (904) is real or fake (i.e., produced by the generator (902)). The adversarial loss is used to guide and update the weights of both the discriminator (904) and the generator (902). In other words, guided by the adversarial loss (918), the weights of the generator (902) are updated to produce an inpainting image (912), which when used to infill a masked image (910), cannot be distinguished from an original (or real) image by the discriminator (904). Once trained, the discriminator (904) of the DCGAN (900) may be discarded and the generator (902) may be used to process images with one or more removed distorted objects to generate the replacement backgrounds for the masked regions. For example, FIG. 8C depicts an example inpainted image (806), where a representative background was generated by the trained generator (902) to replace the pedestrian (802) in the image of FIG. 8A corresponding to the mask shown in FIG. 8B. The generated representative background replaces the masked portion to produce the example inpainted image (806). As seen in FIG. 8C, the distant vehicle (803) is still present in the example inpainted image (806) because the pixels corresponding to the distant vehicle (803) were not masked by the image masker.

One with ordinary skill in the art will recognize that the architectures of the generator (902) and the discriminator (904) of the DCGAN (900) of FIG. 9 are represented generally. In practice, these architectures may be altered to include additional components and functionality such as residual connections, normalization, and various convolutions taken at different length scales. As such, the second machine-learned model is not limited by the DCGAN (900) depicted in FIG. 9.

In accordance with one or more embodiments, the loss function of the second machine-learned model (e.g., the DCGAN (900) of FIG. 9) is weighted according to the object weight determined for each detected object by the weight function (e.g., EQ. 2). By weighting the loss function according to object weights, the second machine-learned model is further promoted to generate realistic infill backgrounds for the objects with the greatest expected level of distortion and/or the objects most desired to be replaced with landscape (e.g., other vehicles). It is noted that the depth estimator and weight function may be applied to images without masked objects. In this way, the second training dataset may have object weights assigned to artificially masked regions to promote the reconstruction of nearfield backgrounds (landscapes). In summary, in some embodiments, the loss function of the second machine-learned model is weighted according to object weights, where the object weights may be calculated for detected distorted objects and/or artificially masked regions.

Figure 10:
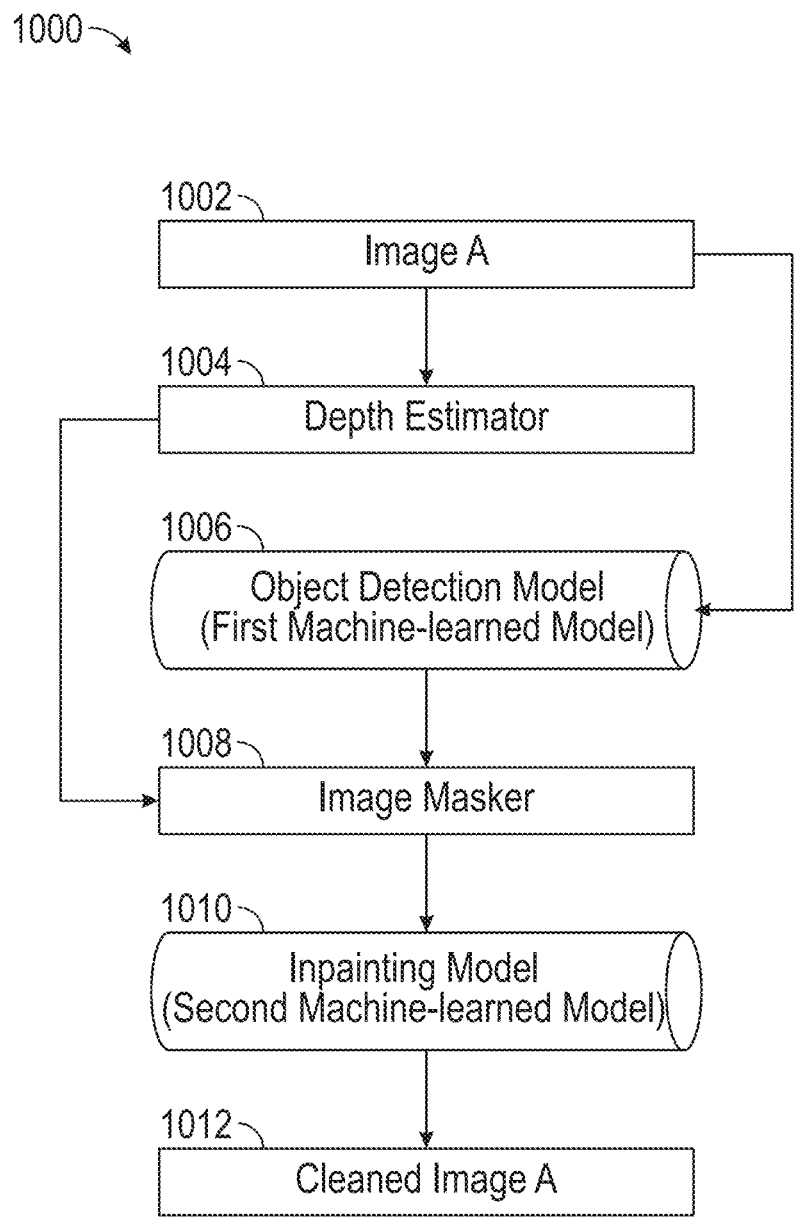
FIG. 10 depicts an image processing pipeline in accordance with one or more embodiments.

FIG. 10 depicts the general process of removing distorted objects from an image and replacing the distorted object regions with a representative background. This process is referred to herein as the image processing pipeline (1000). In accordance with one or more embodiments, an image A (1002) is received from a camera disposed on a vehicle (102). Image A (1002) may undergo any pre-processing step known in the art, such as resizing, normalization, and color correction. Further, image A (1002) is processed by the depth estimator (1004). In one or more embodiments, the depth estimator (1004) returns a depth field for image A (1002). Image A (1002) is also processed by a trained object detection model (1006), also described herein as the first machine-learned model. The object detection model (1006) detects distorted objects in the image A (1002). The object detection model (1006) returns the location and class distribution of detected distorted objects in image A (1002). In other embodiments, the depth estimator (1004) acts on Image A (1002) after the object detection model (1006) has detected and identified objects in Image A (1002). In this case, the depth estimator (1004) returns a distance (or depth) for each detected object in Image A. However, for simplicity, the depth estimator (1004) is shown as a pre-step to the object detection model (1006) in FIG. 10. The depth field (or distance/depth of objects), location, and class distribution of detected objects are processed by an image masker (1008). The image masker (1008) applies a user-defined weight function to determine an object weight for each detected object in image A (1002). Then, according to a criterion, the image masker (1008) masks regions of detected objects (e.g., distorted vehicles) according to their associated object weight. The image masker (1008) returns a masked version of image A (1002). The masked image is passed to the inpainting model (1010), also known as the second machine-learned model. The inpainting model (1010) processes the masked image to generate a representative background for each masked region in the masked image. The inpainting model (1010) further replaces the masked regions of the masked image with their respective representative backgrounds to form a cleaned version of image A (1002). While replacing a masked region with a representative background, the inpainting model (1010) may blend the representative background with one or more adjacent pixels in the unmasked portion of the masked image. Blending promotes a smooth transition between the inserted representative background and unmasked portion of the image. The cleaned version is referred to herein as cleaned image A (1012). Cleaned image A (1012) is like image A (1002) but has all detected and distorted objects removed and replaced with representative backgrounds. Cleaned image A (1012) may be stitched with other images processed in a similar manner. Cleaned image A (1012) may be used to generate a bowl view perspective.

Figure 11A:
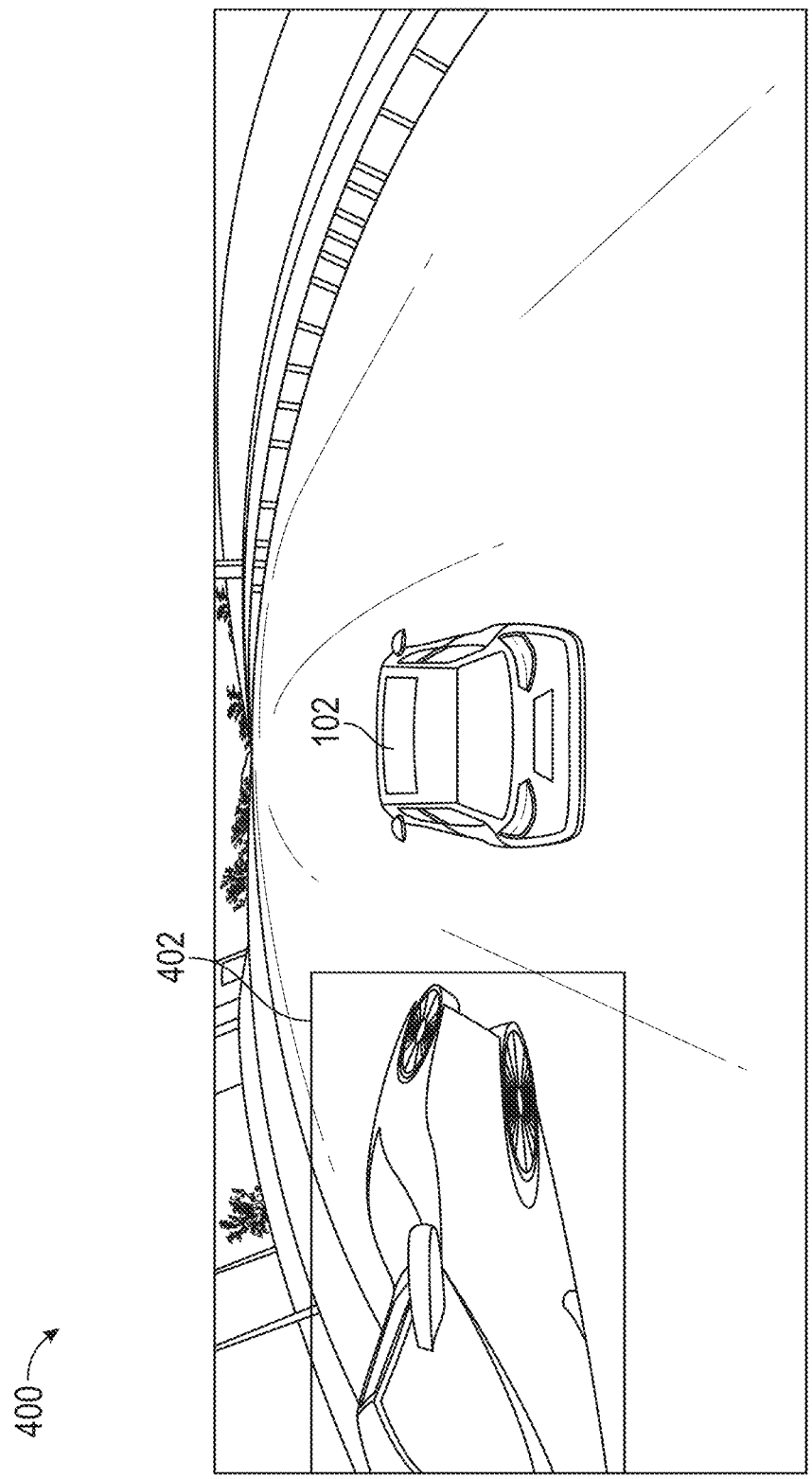
FIG. 11A depicts an example bowl view perspective in accordance with one or more embodiments.
Figure 11B:
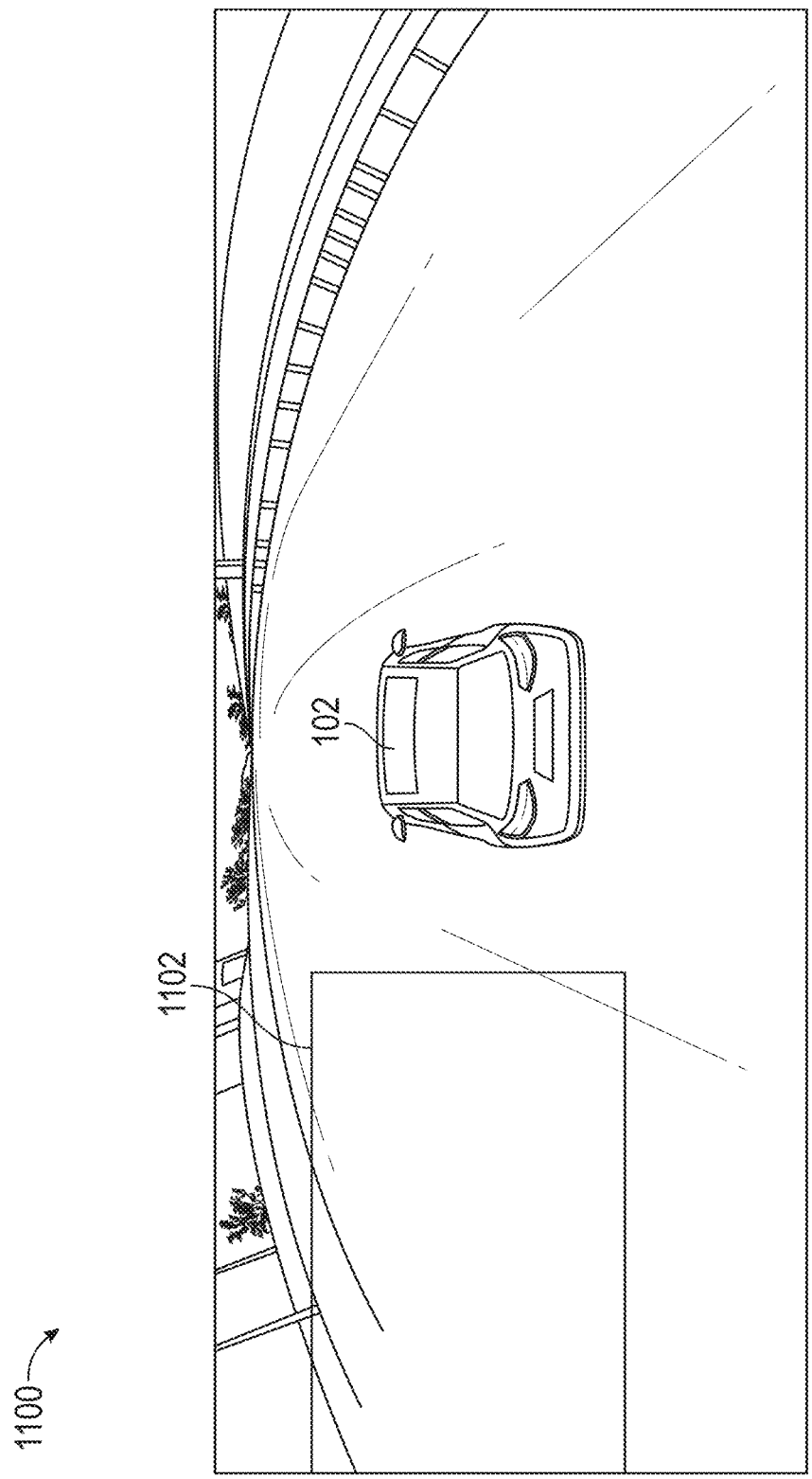
FIG. 11B depicts a corrected bowl view perspective, in accordance with one or more embodiments.

Turning to FIGS. 11A and 11B, FIG. 11A shows the same example bowl view perspective (400) depicted in FIG. 4. To create the bowl view perspective (400), a plurality of images is collected from a plurality of cameras disposed on the vehicle (102). The plurality of images is stitched and projected onto a bowl (304) to form a bowl view perspective (400) as previously described. As seen in FIG. 11A, an adjacent vehicle (402) is captured in the plurality of images. The adjacent vehicle (402) appears distorted. The distortion occurs due to, in part, the use of fisheye lenses with the plurality of cameras disposed on the vehicle (402). The distorted adjacent vehicle (402) is distracting and obstructs the landscape in the bowl view perspective (400). Each image in the plurality of images is processed according to the image processing pipeline (1000) of FIG. 10 resulting in a plurality of cleaned images. FIG. 11B depicts a corrected bowl view perspective (1100) constructed using the plurality of cleaned images. The region containing the adjacent vehicle (402) is replaced with a representative background (1102) in FIG. 11B. The corrected bowl view perspective (1100), as seen in FIG. 11B, is useful and displays a landscape that is not obstructed by distorted objects.

Figure 12:
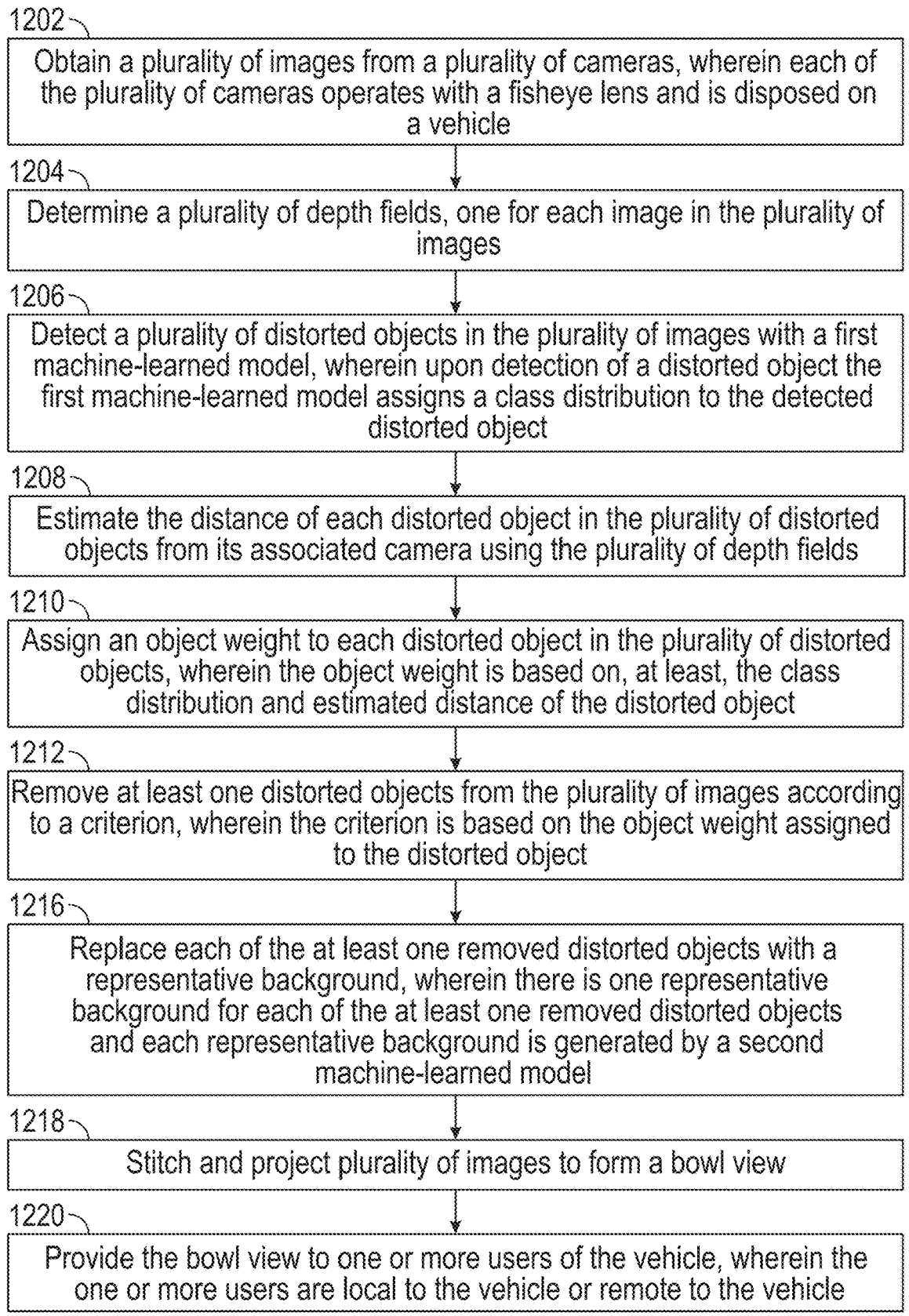
FIG. 12 depicts a flowchart in accordance with one or more embodiments.

In accordance with one or more embodiments, FIG. 12 depicts a flowchart outlining the process of providing a bowl view where distorted objects have been removed. As shown in Block 1202, a plurality of images is obtained. The plurality of images is acquired using a plurality of cameras disposed on a vehicle. Each camera in the plurality of cameras is outfitted with a fisheye lens. Further, the plurality of cameras is capable of capturing images in real time. As such, the plurality of images obtained from the plurality of cameras has an associated time. In Block 1204, a plurality of depth fields, one for each image in the plurality of images is determined using a depth estimator (1004). Each depth field indicates the distance of each pixel in the associated image (from the plurality of images) from the camera (from the plurality of cameras) that was used to capture the associated image. As depicted in Block 1206, a first machine-learned model detects a plurality of distorted objects in the plurality of images. Each detected distorted object is assigned a class distribution by the first machine-learned model. The class distribution represents the probability that a detected distorted object belongs to a given class. The location of each distorted object in the plurality of distorted objects is output by the first machine-learned model. The location information of a distorted object may be returned by the first machine-learned model as a bounding box or masked pixel map. The distance of each detected distorted object from its associated camera is estimated using the plurality of depth fields according to Block 1208. For example, in accordance with one or more embodiments, pixel distances from a depth field are averaged over a region which contains a detected object to produce a distance estimate for that object. In Block 1210, an object weight is assigned to each distorted object based on the class distribution and estimated distance of the distorted object. For example, in accordance with one or more embodiments, EQ. 2 is used to calculate the object weight of a detected object. With an object weight assigned to each distorted object in the plurality of distorted objects, at least one distorted objects are removed from the plurality of images, as shown in Block 1212. A distorted object is removed from an image according to a criterion, where the criterion is based on the object weight assigned to the distorted object. For example, in one or more embodiments, the criterion is a simple threshold where a distorted object is removed if its assigned object weight is greater than or equal to a user-defined threshold value (e.g., threshold value may be set to 6.2). Distorted objects may be removed from an image by masking the pixels in the image in the regions determined to contain the distorted objects. In accordance with one or more embodiments, the processes of Blocks 1208, 1210, and 1212 are performed by an image masker (1008). In Block 1216, the at least one removed distorted objects are replaced with at least one representative backgrounds, where there is a one-to-one correspondence between representative backgrounds and removed distorted objects. Each representative background is generated by a second machine-learned model. In accordance with one or more embodiments, the second machine-learned model receives the plurality of images where at least one distorted objects have been removed (likely covered with a mask) and returns a representative background for each of the plurality of images. The second machine-learned model replaces the regions in the plurality of images where distorted objects have been removed with the representative backgrounds. In Block 1218, the plurality of images, now with distorted images replaced by representative backgrounds, is stitched and projected to form a bowl view. The bowl view is provided to one or more users of the vehicle, where the one or more users may be local to the vehicle or remote to the vehicle. In other words, a bowl view may be displayed to users within the vehicle (e.g., the driver or passenger of the vehicle, while the vehicle is in operation) or to users external to the vehicle (e.g., a viewer virtually travelling with the vehicle). The bowl view, formed according to the flow chart of FIG. 12 does not contain distorted objects and provides an unobstructed view of the landscape surrounding the vehicle.

Figure 13:
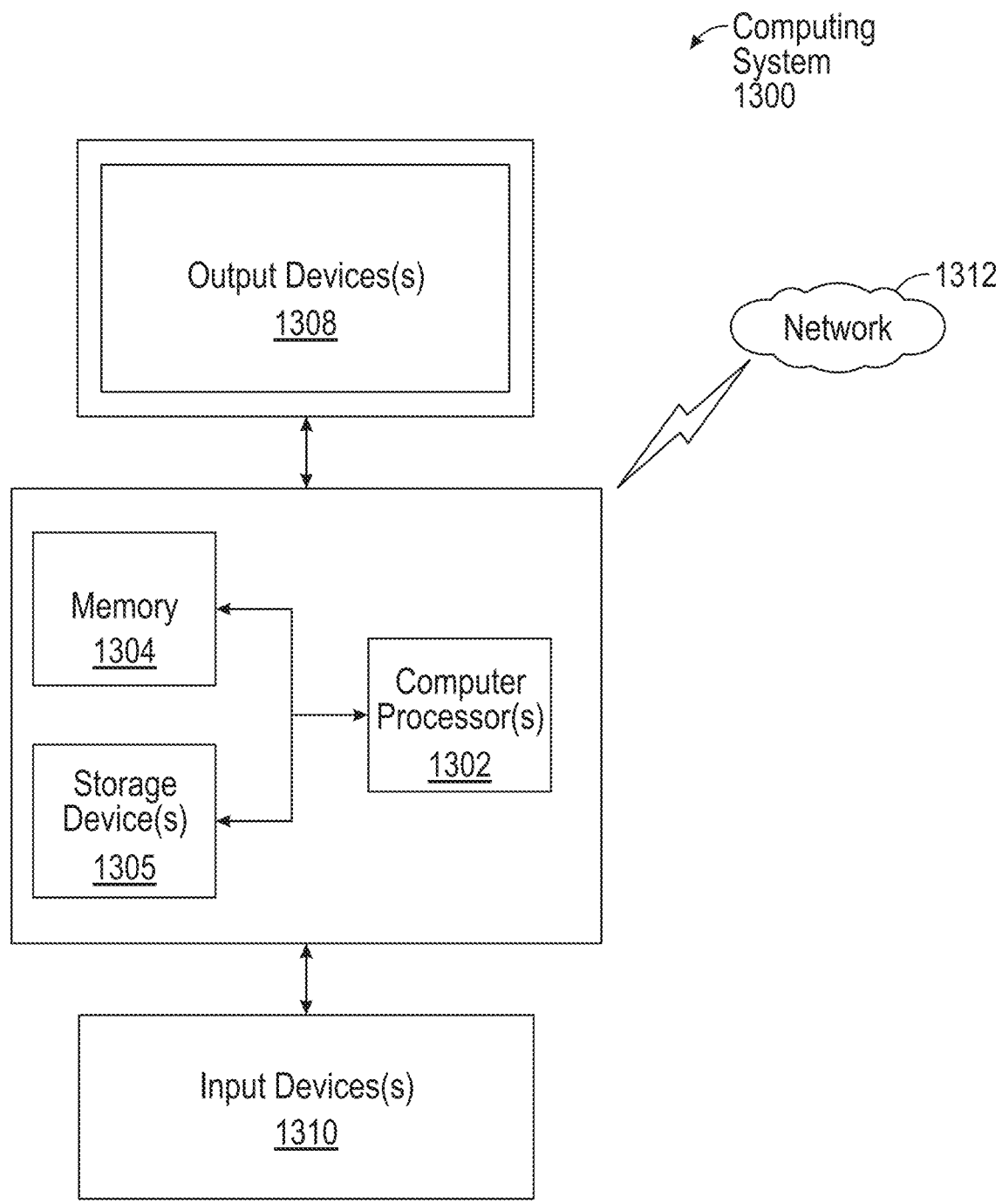
FIG. 13 depicts a system in accordance with one or more embodiments.

Embodiments of the invention may be implemented on virtually any type of computing system, regardless of the platform being used. For example, the image processing pipeline (1000) discussed in embodiments herein may be implemented as a computing system as shown in FIG. 13 or include one or more computing systems. Such a computing system may be one or more mobile devices (e.g., laptop computer, smart phone, personal digital assistant, tablet computer, or other mobile device), desktop computers, servers, blades in a server chassis, one or more ECUs in a vehicle or any other type of computing device or devices that includes at least the minimum processing power, memory, and input and output device(s) to perform one or more embodiments of the invention. For example, as shown in FIG. 13, the computing system (1300) may include one or more computer processor(s) (1302), associated memory (1304) (e.g., random access memory (RAM), cache memory, flash memory, etc.), one or more storage device(s) (1306) (e.g., a hard disk, an optical drive such as a compact disk (CD) drive or digital versatile disk (DVD) drive, a flash memory stick, etc.), and numerous other elements and functionalities. The computer processor(s) (1302) may be an integrated circuit for processing instructions. For example, the computer processor(s) may be one or more cores, or micro-cores of a processor. The computing system (1300) may also include one or more input device(s) (1310), such as a touchscreen, keyboard, mouse, microphone, touchpad, electronic pen, or any other type of input device. Further, the computing system (1300) may include one or more output device(s) (1308), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (1300) may be connected to a network (1312) (e.g., a local area network (LAN), a wide area network (WAN) such as the Internet, mobile network, or any other type of network) via a network interface connection (not shown). The input and output device(s) may be locally or remotely (e.g., via the network (1312)) connected to the computer processor(s) (1302), memory (1304), and storage device(s) (1306). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (1300) may be located at a remote location and be connected to the other elements over a network (1312). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While multiple embodiments and machine-learned model types have been suggested, one skilled in the art will appreciate that this process, of detecting and replacing distorted objects with representative backgrounds, is not limited to the use of the machine-learned models described herein. Machine-learned models such a random forest, or non-parametric methods such a K-nearest neighbors or a Gaussian process may be readily inserted into this framework and do not depart from the scope of this disclosure.

Further, while the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for generating an unobstructed bowl view of a vehicle, comprising:
    obtaining a plurality of images from a plurality of cameras, wherein each of the plurality of cameras operates with a fisheye lens and is disposed on the vehicle;
    determining a plurality of depth fields, one for each image in the plurality of images;
    detecting a first distorted object in the plurality of images with a first machine-learned model,
    determining, with the first machine-learned model, a class distribution for the detected first distorted object;
    estimating a distance of the first distorted object from its associated camera using the plurality of depth fields;
    assigning an object weight to the first distorted object based on, at least, the class distribution and the estimated distance;
    removing a first portion from the plurality of images corresponding to the first distorted object in response to the object weight satisfying a criterion;
    generating, with a second machine-learned model, a representative background for the removed first portion based on the plurality of images;
    replacing the first portion in the plurality of images with the representative background;
    stitching and projecting the plurality of images to form the unobstructed bowl view; and
    providing the unobstructed bowl view to one or more users of the vehicle, wherein the one or more users are local to the vehicle or remote to the vehicle.

2. The method of claim 1, further comprising:
    pre-processing the plurality of images.

3. The method of claim 1, further comprising:
    blending the representative background and a surrounding portion in the plurality of images, wherein the surrounding portion excludes the first portion.

4. The method of claim 1, further comprising:
    training the first machine-learned model with a first training dataset,
    wherein the first training dataset comprises training images with annotated distorted objects obtained with one or more cameras outfitted with a fisheye lens.

5. The method of claim 1, further comprising:
    training a generative adversarial network comprising a generator and a discriminator,
    wherein the second machine-learned model is the generator,
    wherein the generator is trained with a second training dataset comprising masked images wherein, for each masked image, a masked portion is retained as a correct background,
    wherein the discriminator is trained with a third training dataset comprising generated images, generated by the generator, and original images.

6. The method of claim 1, wherein the first machine-learned model is a convolutional neural network.

7. The method of claim 1, wherein the second machine-learned model is trained by optimizing a loss function, wherein the loss function uses, in part, the estimated depth and class distribution of an annotated distorted object.

8. A non-transitory computer readable medium storing instructions executable by a computer processor, the instructions comprising functionality for:
    obtaining a plurality of images from a plurality of cameras, wherein each of the plurality of cameras operates with a fisheye lens and is disposed on a vehicle;
    determining a plurality of depth fields, one for each image in the plurality of images;
    detecting a first distorted object in the plurality of images with a first machine-learned model,
    determining, with the first machine-learned model, a class distribution for the detected first distorted object;
    estimating a distance of the first distorted object from its associated camera using the plurality of depth fields;
    assigning an object weight to the first distorted object based on, at least, the class distribution and the estimated distance;
    removing a first portion from the plurality of images corresponding to the first distorted object in response to the object weight satisfying a criterion;
    generating, with a second machine-learned model, a representative background for the removed first portion based on the plurality of images;
    replacing the first portion in the plurality of images with the representative background;
    stitching and projecting the plurality of images to form an unobstructed bowl view; and
    providing the unobstructed bowl view to one or more users of the vehicle, wherein the one or more users are local to the vehicle or remote to the vehicle.

9. The non-transitory computer readable medium of claim 8, further comprising instructions for:
    pre-processing the plurality of images.

10. The non-transitory computer readable medium of claim 8, further comprising instructions for:
    blending the representative background and a surrounding portion in the plurality of images, wherein the surrounding portion excludes the first portion.

11. The non-transitory computer readable medium of claim 8, further comprising instructions for:
    training the first machine-learned model with a first training dataset, wherein the first training dataset comprises training images with annotated distorted objects obtained with one or more cameras outfitted with a fisheye lens.

12. The non-transitory computer readable medium of claim 8, further comprising instructions for:
training a generative adversarial network comprising a generator and a discriminator,
wherein the second machine-learned model is the generator,
wherein the generator is trained with a second training dataset comprising masked images wherein, for each masked image, a masked portion is retained as a correct background,
wherein the discriminator is trained with a third training dataset comprising generated images, generated by the generator, and original images.

13. The non-transitory computer readable medium of claim 8, wherein the first machine-learned model is a convolutional neural network.

14. The non-transitory computer readable medium of claim 8, wherein the second machine-learned model is trained by optimizing a loss function, wherein the loss function uses, in part, the estimated depth and class distribution of an annotated distorted object.

15. A system, comprising:
a vehicle;
a plurality of cameras, wherein each camera in the plurality of cameras is disposed on the vehicle, and wherein each camera in the plurality of cameras is outfitted with a fisheye lens;
a depth estimator;
a first machine-learned model;
a second machine-learned model;
an image masker; and
a computer, comprising:
one or more processors, and
a non-transitory computer readable medium storing instructions executable by the one or more computer processors, the instructions comprising functionality for:
obtaining a plurality of images from the plurality of cameras;
determining, with the depth estimator, a plurality of depth fields, one for each image in the plurality of images;
detecting a first distorted object in the plurality of images with the first machine-learned model;
determining, with the first machine-learned model a class distribution for the detected first distorted object;
estimating a distance of the first distorted object from its associated camera using the plurality of depth fields;
assigning an object weight to the first distorted object based on, at least, the class distribution and estimated distance;
removing, with the image masker, a first portion from the plurality of images corresponding to the first distorted object in response to the object weight satisfying a criterion;
generating, with a second machine-learned model, a representative background for the removed first portion based on the plurality of images;
replacing the first portion in the plurality of images with the representative background;
stitching and projecting the plurality of images to form an unobstructed bowl view; and
providing the unobstructed bowl view to one or more users of the vehicle, wherein the one or more users are local to the vehicle or remote to the vehicle.

16. The system of claim 15, wherein the computer further comprises instructions for:
pre-processing the plurality of images.

17. The system of claim 15, wherein the computer further comprises instructions for:
blending the representative background and a surrounding portion in the plurality of images, wherein the surrounding portion excludes the first portion.

18. The system of claim 15, wherein the computer further comprises instructions for:
training the first machine-learned model with a first training dataset,
wherein the first training dataset comprises training images with annotated distorted objects obtained with one or more cameras outfitted with a fisheye lens.

19. The system of claim 15, wherein the computer further comprises instructions for:
training a generative adversarial network comprising a generator and a discriminator,
wherein the second machine-learned model is the generator,
wherein the generative adversarial network is trained with a second training dataset comprising masked images wherein, for each masked image, a masked portion is retained as a correct background,
wherein the discriminator is trained with a third training dataset comprising generated images, generated by the generator, and original images.

20. The system of claim 15, wherein the second machine-learned model is trained by optimizing a loss function, wherein the loss function uses, in part, the estimated depth and class distribution of an annotated distorted object.

* * * * *